(12) United States Patent
Kemp et al.

(10) Patent No.: US 12,479,291 B1
(45) Date of Patent: Nov. 25, 2025

(54) ADJUSTABLE PEDALS

(71) Applicant: Textron Inc., Providence, RI (US)

(72) Inventors: Ricky Veldee Kemp, Augusta, GA (US); Trevor Douglas Roebuck, Evans, GA (US); Baily Guyton Wood, Dublin, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 18/940,234

(22) Filed: Nov. 7, 2024

(51) Int. Cl.
*B60K 26/02* (2006.01)
*B62D 25/20* (2006.01)

(52) U.S. Cl.
CPC .............. *B60K 26/02* (2013.01); *B62D 25/20* (2013.01); *B60K 2026/025* (2013.01); *B60K 2026/026* (2013.01)

(58) Field of Classification Search
CPC .............. B60K 26/02; B60K 2026/024; B60K 2026/025; B60K 2026/026; B62D 25/20
See application file for complete search history.

(56) References Cited

U.S. PATENT DOCUMENTS

| | | | |
|---|---|---|---|
| 3,897,849 A * | 8/1975 | Mossner | B60K 26/02 74/18 |
| 4,076,091 A | 2/1978 | Forster | |
| 4,106,583 A | 8/1978 | Nemeth | |
| 4,289,324 A | 9/1981 | Nemeth | |
| 4,392,670 A | 7/1983 | Schultz | |
| 4,481,838 A | 11/1984 | Findley et al. | |
| 4,538,696 A | 9/1985 | Carter | |
| 4,573,549 A | 3/1986 | Pankow | |
| 4,586,723 A | 5/1986 | Nabinger | |
| 4,691,587 A | 9/1987 | Farrand et al. | |
| 4,792,149 A | 12/1988 | Harmon | |
| 5,048,444 A | 9/1991 | Moore | |
| 5,137,103 A | 8/1992 | Cartmell | |
| 5,167,389 A | 12/1992 | Reimers | |
| 5,180,023 A | 1/1993 | Reimers | |
| 5,265,695 A | 11/1993 | Piazzi | |

(Continued)

FOREIGN PATENT DOCUMENTS

| | | |
|---|---|---|
| DE | 36 21 043 A1 | 1/1987 |
| DE | 102019207363 A1 * | 11/2020 ............... G05G 1/40 |

(Continued)

OTHER PUBLICATIONS

DE102019207363A1 Machine English Translation (Year: 2020).*

(Continued)

*Primary Examiner* — Jason D Shanske
*Assistant Examiner* — Matthew James O'Neill
(74) *Attorney, Agent, or Firm* — FOLEY & LARDNER LLP

(57) ABSTRACT

A golf cart includes a chassis, a floorboard coupled to the chassis, a seat positioned along the floorboard, a prime mover, a plurality of tractive elements where at least one of the plurality of tractive elements is driven by the prime mover, and a pedal assembly. The pedal assembly includes a housing coupled to the floorboard, a brake pedal coupled to the housing, and an accelerator pedal coupled to the housing. The pedal assembly is (a) laterally translatable along the floorboard and (b) at least one of pivotable or extendable towards and away from the seat.

17 Claims, 18 Drawing Sheets

(56) References Cited

U.S. PATENT DOCUMENTS

| | | |
|---|---|---|
| 5,277,267 A | 1/1994 | Tiffany |
| 5,341,894 A | 8/1994 | Gorder et al. |
| 5,346,028 A | 9/1994 | Cassano |
| 5,375,673 A | 12/1994 | Mc Call et al. |
| 5,452,773 A | 9/1995 | Hrupka |
| 5,613,404 A | 3/1997 | Lykken et al. |
| 5,727,642 A | 3/1998 | Abbott |
| 5,732,788 A | 3/1998 | Brown |
| 5,749,424 A | 5/1998 | Reimers |
| 5,836,211 A | 11/1998 | Ross et al. |
| 5,899,284 A | 5/1999 | Reimers et al. |
| 6,116,646 A | 9/2000 | Plas et al. |
| 6,397,961 B1 | 6/2002 | Sutton |
| 6,450,058 B2 | 9/2002 | Latz et al. |
| 6,460,427 B1 | 10/2002 | Hedderly |
| 6,659,208 B2 | 12/2003 | Gaffney et al. |
| 7,086,491 B2 | 8/2006 | Matte |
| 7,195,096 B1 | 3/2007 | Mawhinney |
| 7,278,653 B2 | 10/2007 | Pelka et al. |
| 7,293,619 B2 | 11/2007 | Mitchell |
| 7,437,229 B2 | 10/2008 | Ohtsubo et al. |
| 7,581,748 B2 | 9/2009 | Reimers |
| 7,621,562 B2 | 11/2009 | Longo |
| 7,815,009 B1 | 10/2010 | Speelman |
| 7,866,428 B1 | 1/2011 | Oliver |
| 8,777,243 B1 | 7/2014 | Ho |
| 10,099,579 B2 | 10/2018 | Kates et al. |
| 10,107,385 B1 | 10/2018 | Richner |
| 2002/0177632 A1 | 11/2002 | Choi |
| 2003/0019684 A1 | 1/2003 | Wucherpfennig et al. |
| 2003/0121356 A1 | 7/2003 | Rixon et al. |
| 2003/0132625 A1 | 7/2003 | Bechtel et al. |
| 2003/0173122 A1 | 9/2003 | Cassoni |
| 2004/0003676 A1 | 1/2004 | Danek |
| 2004/0129106 A1* | 7/2004 | Prat .................. B60T 7/06 74/512 |
| 2004/0129487 A1 | 7/2004 | Shabana et al. |
| 2004/0251673 A1 | 12/2004 | Lee |
| 2005/0199086 A1 | 9/2005 | Magrini |
| 2006/0131865 A1 | 6/2006 | Wasek et al. |
| 2006/0230869 A1* | 10/2006 | Cosby .................. G05G 1/30 74/512 |
| 2008/0023236 A1 | 1/2008 | Falkiner |
| 2008/0150270 A1 | 6/2008 | Longo |
| 2008/0196951 A1 | 8/2008 | Gal et al. |
| 2008/0211217 A1 | 9/2008 | Sanville |
| 2010/0001501 A1 | 1/2010 | Miller |
| 2012/0205177 A1 | 8/2012 | Jackson |
| 2014/0125021 A1 | 5/2014 | Du Toit |
| 2016/0159255 A1 | 6/2016 | Kates et al. |
| 2018/0056152 A1 | 3/2018 | Reimers et al. |
| 2019/0302827 A1* | 10/2019 | Wojciechowski ... G05D 1/0242 |
| 2021/0009182 A1 | 1/2021 | Ten Haaft et al. |
| 2021/0229733 A1 | 7/2021 | Kurokawa et al. |
| 2021/0300455 A1 | 9/2021 | Tokizaki |
| 2023/0074100 A1 | 3/2023 | Melville-Brown |

FOREIGN PATENT DOCUMENTS

| | | |
|---|---|---|
| FR | 3144963 A1 | 7/2024 |
| WO | WO-03/082622 A2 | 10/2003 |
| WO | WO-2024/078963 A1 | 4/2024 |

OTHER PUBLICATIONS

Tajmout, FR-3144963-A1, Machine Translation of Specification (Year: 2024).

Yoshida, DE-3621043-A1, Machine Translation of Specification (Year: 1987).

* cited by examiner

ADJUSTABLE PEDALS

BACKGROUND

The present application relates generally to golf vehicles. More specifically, the present application relates to mechanisms and structures for adjusting assemblies on golf vehicles.

SUMMARY

One embodiment relates to a golf cart. The golf cart includes a chassis, a floorboard coupled to the chassis, a seat positioned along the floorboard, a prime mover, a plurality of tractive elements where at least one of the plurality of tractive elements is driven by the prime mover, and a pedal assembly. The pedal assembly includes a housing coupled to the floorboard, a brake pedal coupled to the housing, and an accelerator pedal coupled to the housing. The pedal assembly is (a) laterally translatable along the floorboard and (b) at least one of pivotable or extendable towards and away from the seat.

Another embodiment relates to a recreational vehicle. The recreational vehicle includes a chassis, a floorboard coupled to the chassis, the floorboard defining an opening, a seat positioned along the floorboard, a prime mover, a plurality of tractive elements where at least one of the plurality of tractive elements is driven by the prime mover, and a pedal assembly at least partially disposed within the opening. The pedal assembly is at least one of (a) laterally translatable along the floorboard or (b) at least one of pivotable or extendable towards and away from the seat.

Still another embodiment relates to an adjustable pedal assembly for a recreational vehicle. The adjustable pedal assembly includes a pedal housing, a brake pedal coupled to the pedal housing, an accelerator pedal coupled to the pedal housing, a first actuator configured to pivot or translate the pedal housing in a first direction, and a second actuator configured to translate the pedal housing in a second direction.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
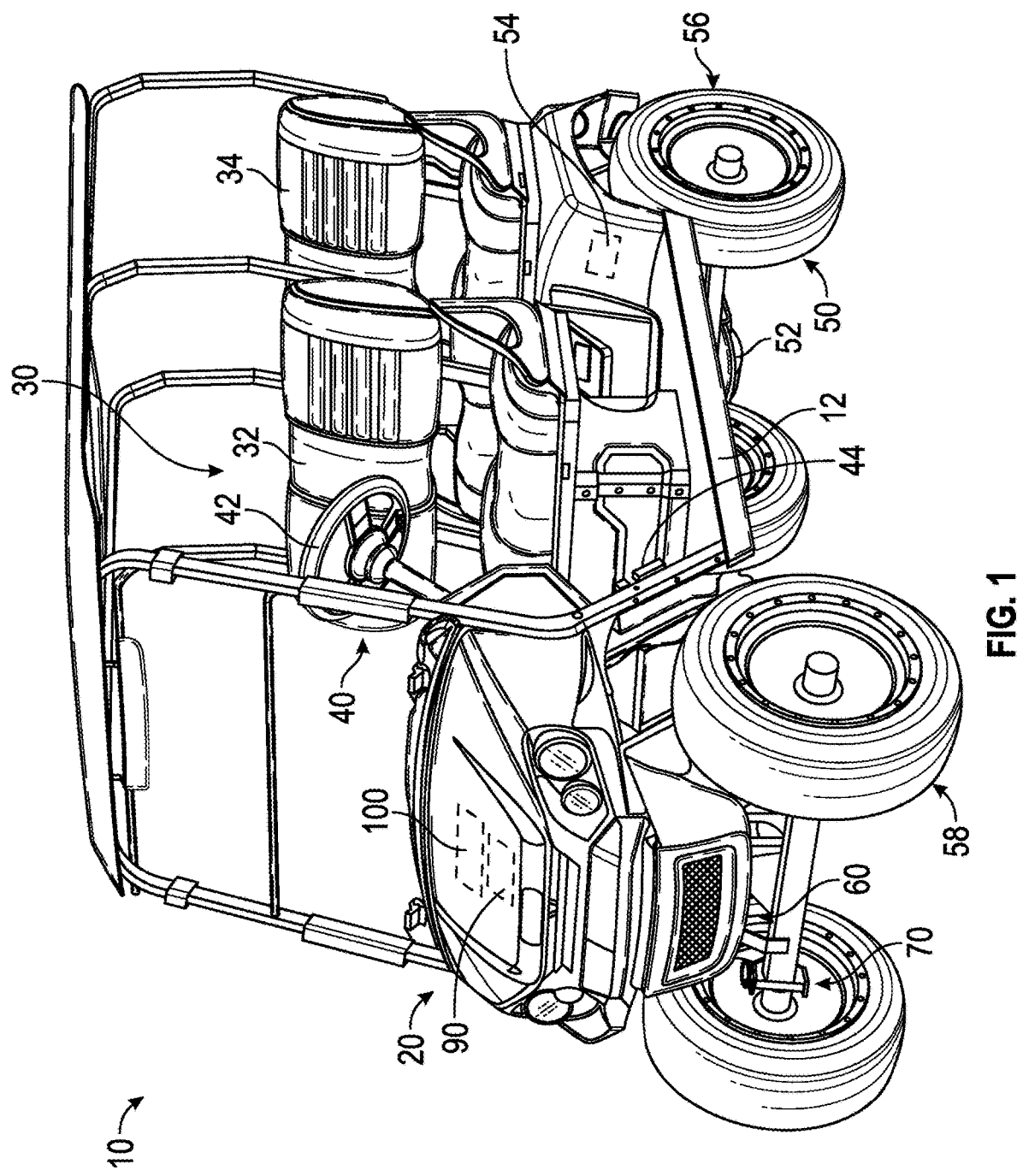
FIG. 1 is a perspective view of a vehicle, according to an exemplary embodiment.
Figure 2:
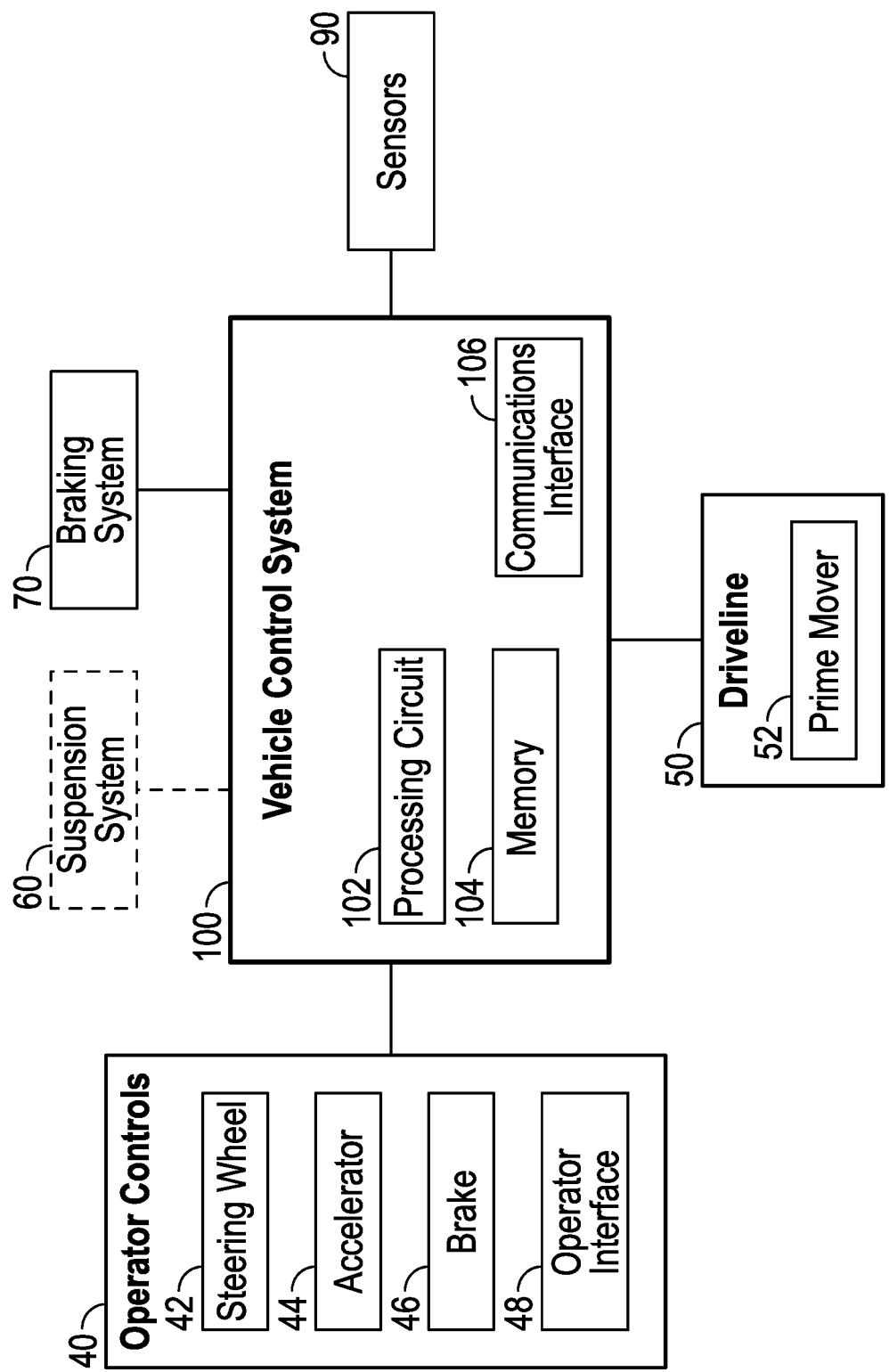
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), a low speed vehicle ("LSV"), a personal transport vehicle ("PTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, electric regenerative braking is employed (e.g., via the prime mover 52, an electric motor, etc.) in combination with or instead of using the braking system 70 to facilitate braking of one or more components of the driveline 50.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, a Doppler sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Fleet Monitoring and Control System

Figure 3:
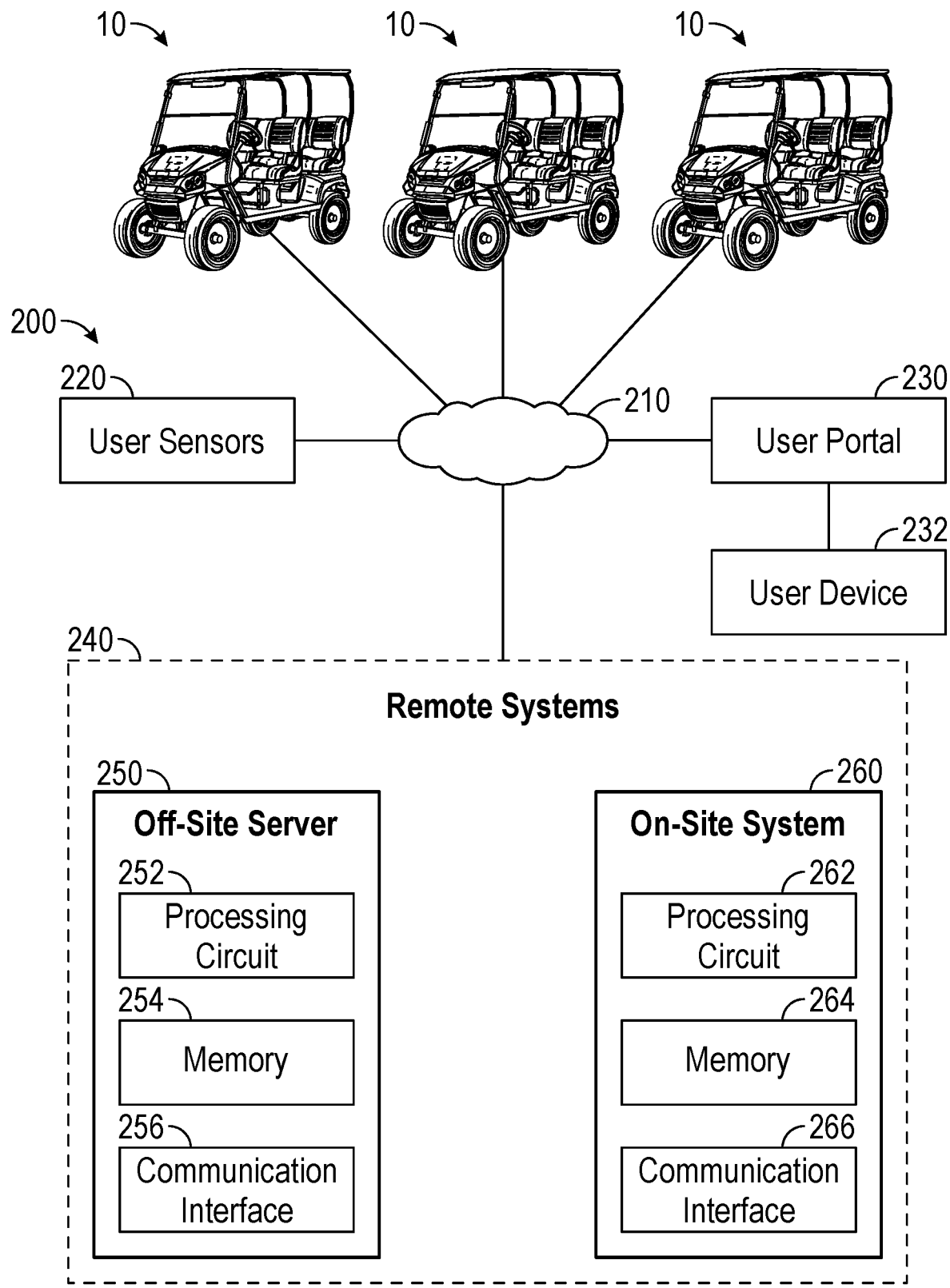
FIG. 3 is a schematic block diagram of a fleet monitoring and control system including a plurality of the vehicles of FIG. 1, according to an exemplary embodiment.

As shown in FIG. 3, a monitoring and control system, shown as fleet monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210. In some embodiments, the fleet monitoring and control system 200 does not includes the user portal 230 and/or the user device 232.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, a heart rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons breaking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). As shown in FIG. 3, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle control systems 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Adjustable Vehicle Components

Steering Column

Figure 4:
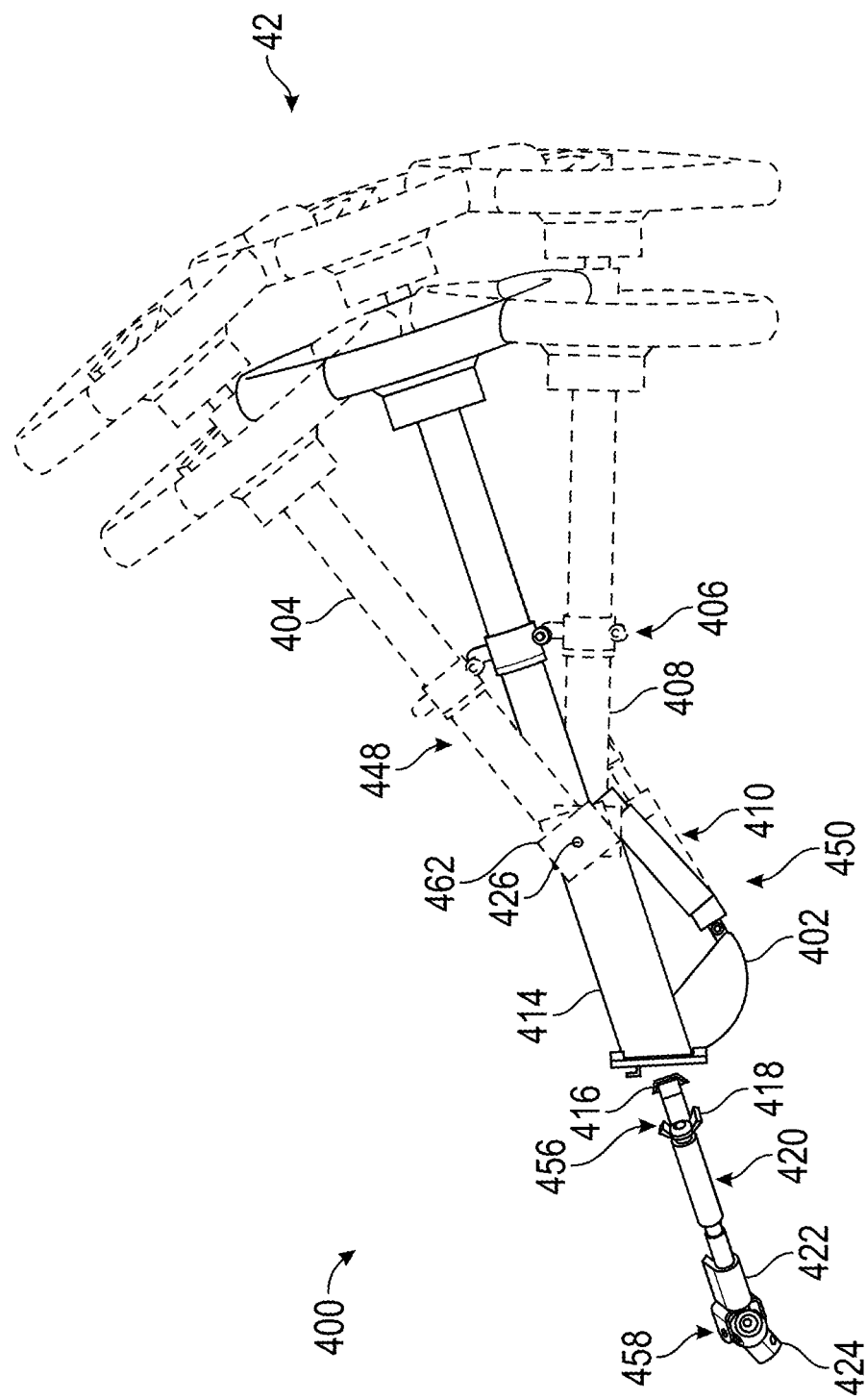
FIG. 4 is a perspective view of an adjustable steering column assembly of the vehicle of FIG. 1, according to exemplary embodiments.
Figure 6:
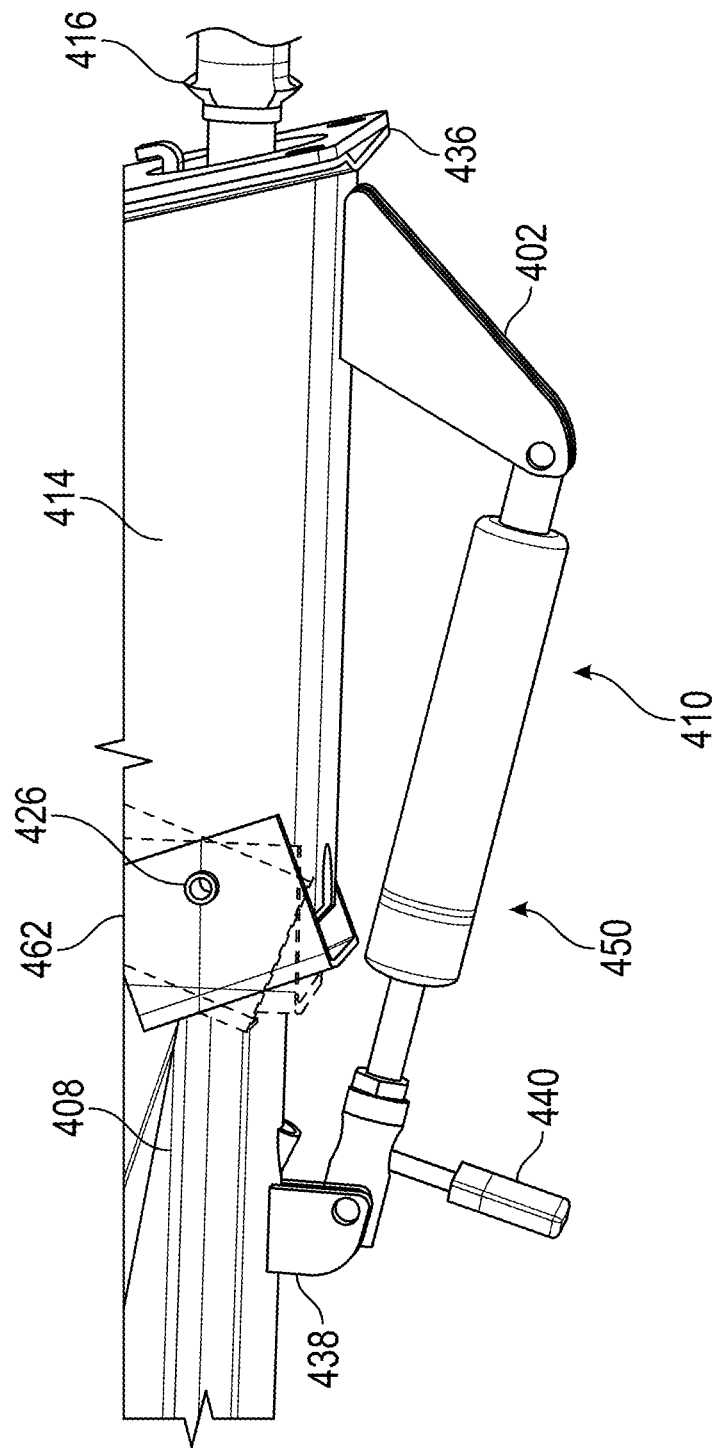
FIG. 6 is a detailed view of a tilting assembly of the adjustable steering column assembly of FIG. 4, according to an exemplary embodiment.
Figure 7:
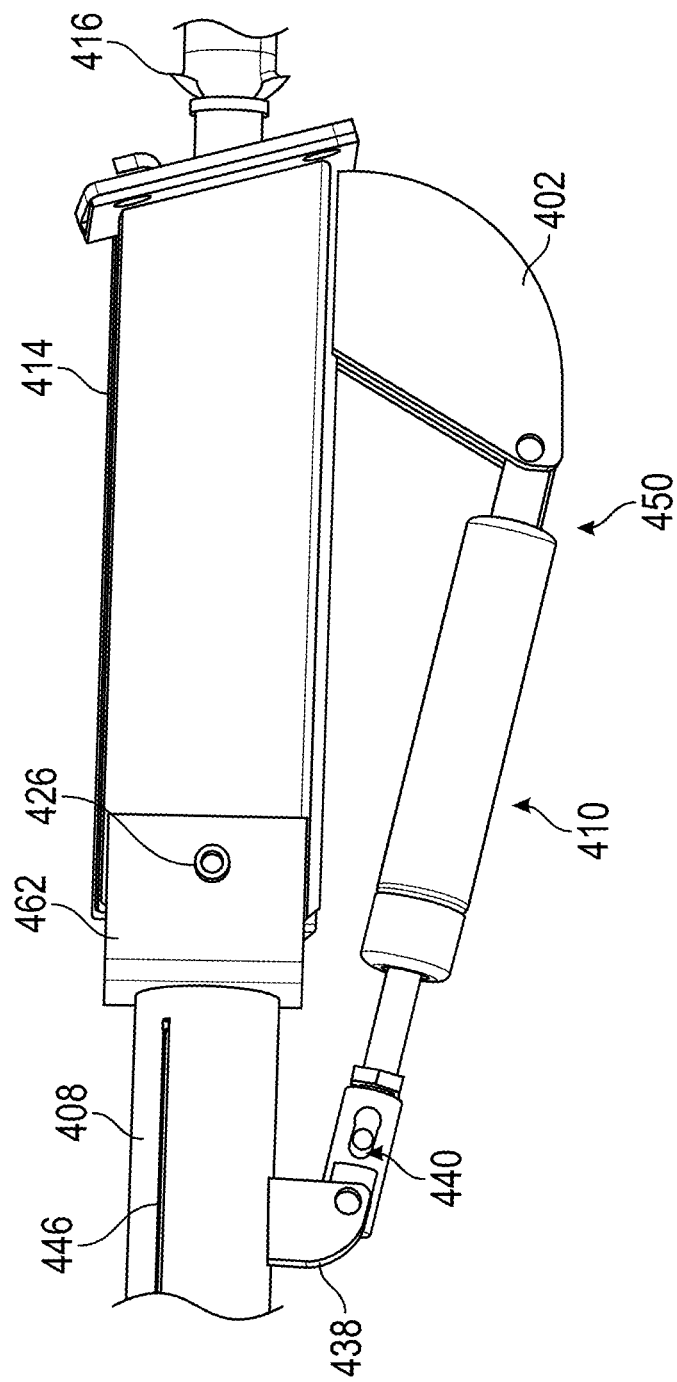
FIG. 7 is another detailed view of the tilting assembly of the f FIG. 6, according to an exemplary embodiment.
Figure 8:
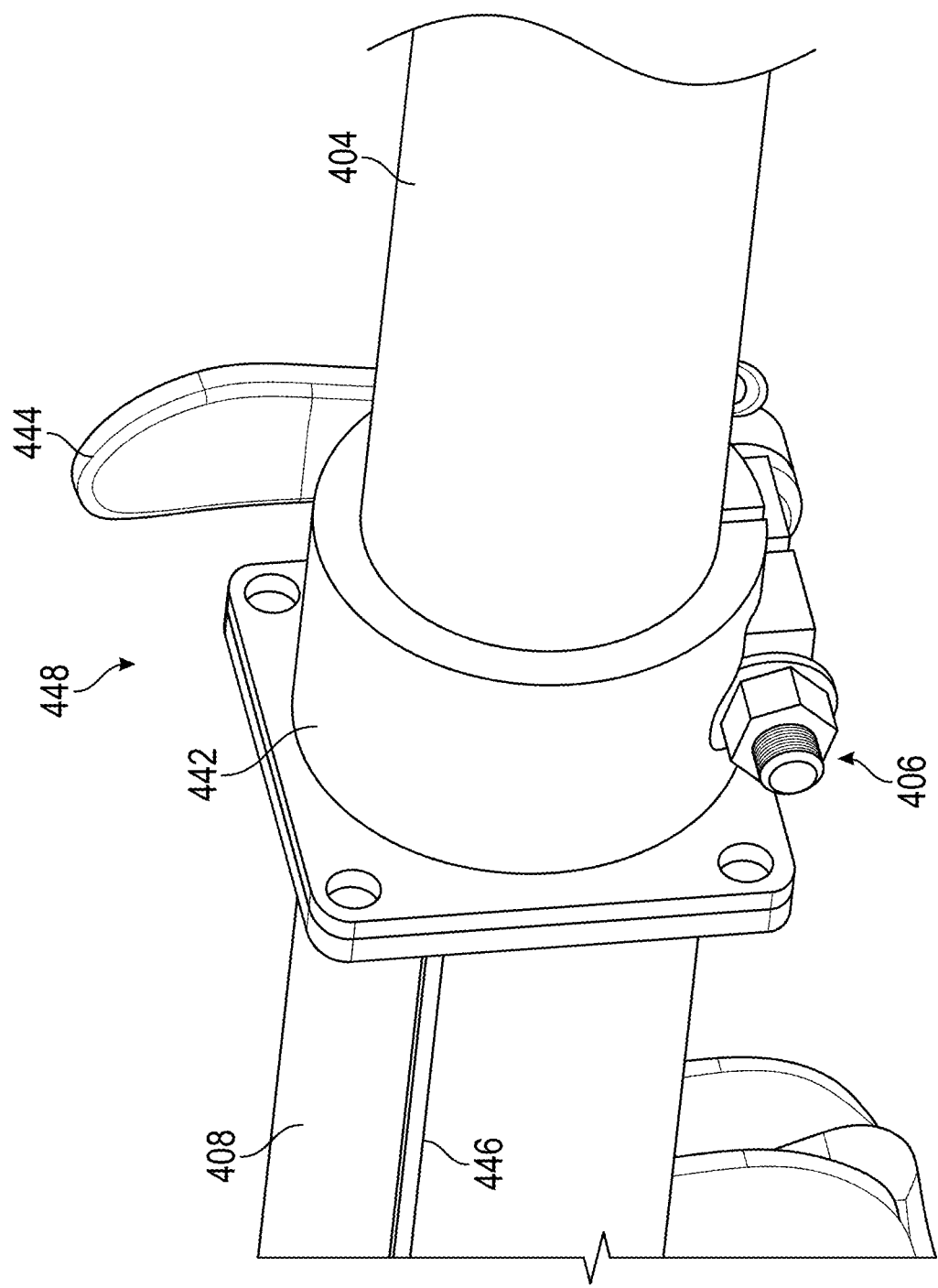
FIG. 8 is a perspective view of a telescoping assembly of the adjustable steering column assembly of FIG. 4, according to an exemplary embodiment.

Referring now to FIGS. 4-8, the vehicle 10 includes an adjustable steering assembly, shown as steering column assembly 400. The steering column assembly 400 includes the steering wheel 42 coupled to a shaft assembly, shown as telescoping shaft assembly 448. As shown in FIGS. 4 and 8, the telescoping shaft assembly 448 includes a first shaft 404 coupled to the steering wheel 42 and slidably disposed inside of a second shaft 408. As shown in FIG. 4, the first shaft 404 is configured to move axially within the second shaft 408 to extend and retract in length. In this way, the first shaft 404 may be moved towards a user or away from a user. As shown in FIGS. 4 and 8, the telescoping shaft assembly 448 includes a locking assembly 406 configured to selectively secure the first shaft 404 in place relative to the second shaft 408 (e.g., a clamp, a clamshell snap, etc.). According to an exemplary embodiment, the locking assembly 406 is operated manually, as described in greater detail herein. In other embodiments, the locking assembly 406 engaged via an electric or pneumatic actuator.

Figure 5:
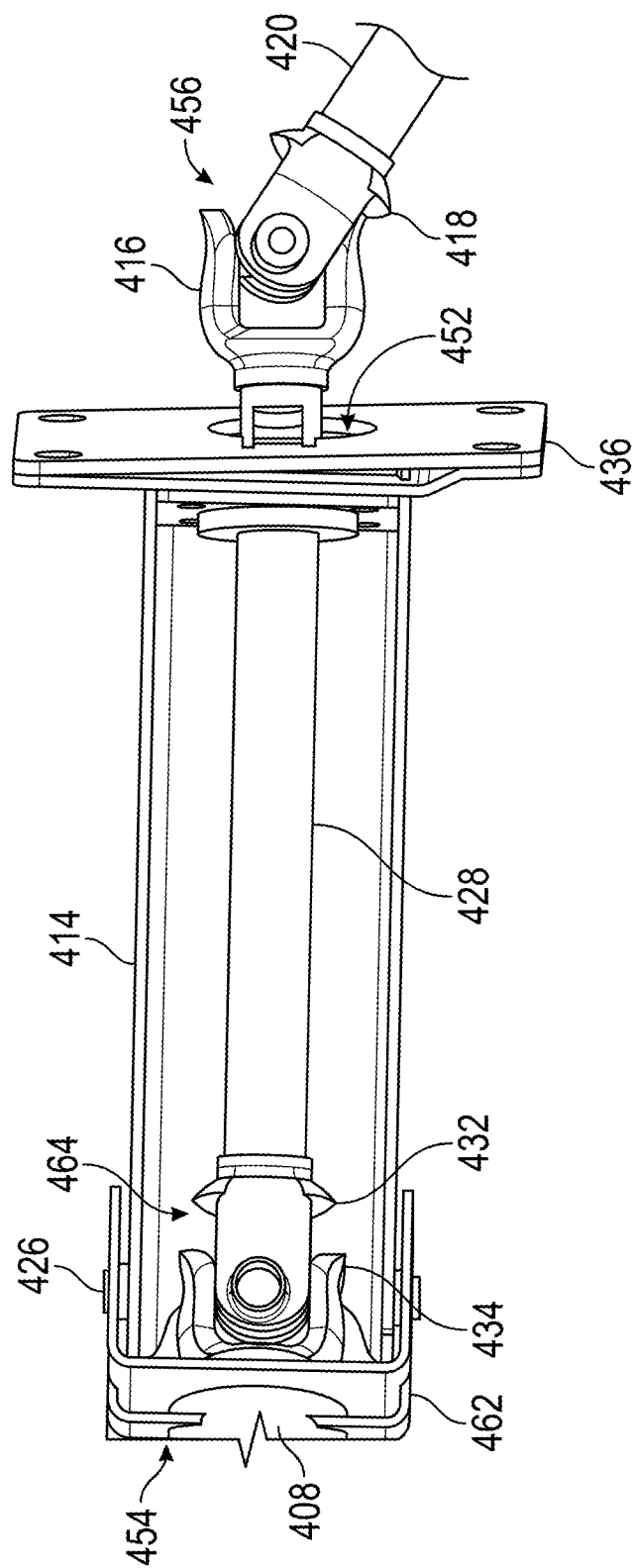
FIG. 5 is an internal view of a portion of the adjustable steering column assembly of FIG. 4, according to exemplary embodiments.

As shown in FIGS. 4, 6, and 7, the steering column assembly 400 includes a tilt adjustment system, shown as tilting assembly 450, coupled to the second shaft 408 of the telescoping shaft assembly 448 that enables adjustment of the angle of the telescoping shaft assembly 448 and, thereby, the steering wheel 42. As shown in FIGS. 4-7, the tilting assembly 450 includes a housing, shown as shaft housing 414, with a rotatable connection, shown as bracket 462, pivotably coupled to an end thereof via a coupler (e.g., a pin, bolt, fastener, etc.), shown as connector 426. The bracket 462 is coupled to a lower or bottom end of the second shaft 408 such that the telescoping shaft assembly 448 is pivotably coupled to the shaft housing 414 via the bracket 462. The tilting assembly 450 further includes an actuator, shown as tilt actuator 410, pivotably coupled to (a) the shaft housing 414 via a first interface (e.g., bracket, flange, etc.), shown as mount 402, extending therefrom and (b) the second shaft 408 via a second interface (e.g., bracket, flange, etc.), shown as mount 438, extending therefrom.

As shown in FIG. 5, the steering column assembly 400 includes a shaft housing, shown as intermediate shaft 428, positioned within and extending through the shaft housing 414. The intermediate shaft 428 is coupled with a intermediate shaft, shown as steering shaft 420. In some examples, the steering shaft 420 connects to a steering gear (e.g., a rack-and-pinion, a steering box, etc.). The steering gear (not shown) converts the rotational motion of the steering wheel 42 into the linear motion to turn the tractive assembly or assemblies 56, 58. As shown in FIG. 5, the intermediate shaft 428 includes one or more universal joints, shown as joint 464 and joint 456, that connect the intermediate shaft 428 to the steering shaft 420 and the second shaft 408. The joint 464 and the joint 456 are designed to allow the transfer of rotational motion between shafts that are not perfectly aligned. In this way, the joint 464 and the joint 456 allow rotation despite variations in alignment caused by vehicle movement, steering column adjustments, and/or suspension travel.

As shown in FIGS. 4 and 5, the intermediate shaft 428 includes a yoke 416 received by a yoke 418 of the steering shaft 420. The yoke 416 and the yoke 418 are coupled together, thereby forming the joint 456 that allows the intermediate shaft 428 and the steering shaft 420 to pivot independently along two different axes. This configuration permits the intermediate shaft 428 and the steering shaft 420 to rotate in unison, even when they are not perfectly aligned or when the angular relationship between them changes (e.g., due to steering column adjustments, road conditions, suspension shifts, etc.). Similarly, as shown in FIG. 4, the steering shaft 420 is configured to couple to the steering gear via a universal joint, shown as joint 458. In this example, a yoke 422 of the steering shaft 420 is coupled with a yoke 424 of the steering gear, thereby forming the joint 458. The yoke 424 transmits the rotational energy from the steering shaft 420 to an input the steering gear or box, thereby directing the turn of the tractive assemblies 56, 58.

As shown in FIG. 5, the shaft housing 414 includes a flange, shown as mounting plate 436, positioned at a lower end thereof (e.g., at the end nearest the steering shaft 420). According to an exemplary embodiment, the mounting plate 436 is configured to couple to a portion of the body assembly 20 and/or the frame 12 (e.g., to the dashboard, a footwell, etc.). As shown in FIGS. 5, the mounting plate 436 defines a first aperture, shown as opening 452, and the bracket 462 defines a second aperture, shown as opening 454. A first or upper end of the intermediate shaft 428 and/or the joint 464 at least partially through the opening 454 and a second or lower end of the intermediate shaft 428 and/or the joint 456 at least partially through the opening 452. In some examples, the intermediate shaft 428 extends past the shaft housing 414 on one side or both sides.

As shown in FIG. 5, a yoke 434 positioned on an end of the second shaft 408 and extends through the opening 454 into the interior of the shaft housing 414. The yoke 434 of the second shaft is coupled to a yoke 432 of the intermediate shaft 428, thereby forming the joint 464. In some examples, the bracket 462 pivotably coupled to an exterior surface of the shaft housing 414 by the connector 426. Specifically, the bracket 462 may be U-shaped (e.g., having a top side and two arms) and may be positioned such that the arms of the bracket 462 straddle the shaft housing 414. In some examples, the bracket 462 is coupled to the shaft housing 414 such that the bracket 462 is allowed to rotate relative to the shaft housing 414 with a single degree of rotational freedom. For example, the bracket 462 may tilt upwards and downwards, but not from side to side (e.g., pitch rotation).

The second shaft 408 may be rotated by a user (e.g., via rotating the steering wheel 42), which causes the joint 464 and the intermediate shaft 428 to rotate. In this example, the opening 454 of the bracket 462 allows the second shaft 408 to rotate in place. In some examples, an additional shaft is disposed inside the first shaft 404 and the second shaft 408. The additional shaft may function similarly to the intermediate shaft 428 by transmitting rotational movement from the steering wheel 42 to the steering gear. In such an example, the bracket 462 may be fixedly coupled to the second shaft 408, preventing the second shaft from rotating relative to the bracket 462. The additional shaft, however, extends into the interior of the shaft housing 414. In this example, the yoke 434 would be positioned on an end of the additional shaft and would couple to the yoke 432 of the intermediate shaft 428 to form the joint 464. In this way, the first shaft 404 and the second shaft 408 may remain stationary while the additional shaft rotates responsive to rotation of the steering wheel 42. Advantageously, the additional shaft allows additional adjustment mechanisms (e.g., the tilt actuator 410 of FIG. 6) to be incorporated into the steering column assembly 400. For example, the shafts 404, 408, 414 remaining stationary allows for the attachment of various adjustment mechanisms (e.g., as shown in FIGS. 6-8) directly to the exterior surfaces of the shafts 404, 408, 414, without interfering with the rotational function of the additional shaft.

As shown in FIG. 4, the second shaft 408 is driven to hinge or rotate relative to the shaft housing 414 by the tilt actuator 410 (e.g., mechanical linear actuators, electric linear actuators, hydraulic cylinders, etc.). The tilt actuator 410 may be configured to extend or retract (e.g., increase in overall length, or decrease in overall length) to facilitate pivoting of the second shaft 408 relative to the shaft housing 414 via the bracket 462. The tilt actuator 410 can be configured to extend (e.g., increase in overall length) to rotate the second shaft 408 upwards, increasing a value of an angle between a floor of the vehicle 10 and the second shaft 408. The tilt actuator 410 can be configured to retract (e.g., decrease in overall length) to rotate the second shaft downwards, decreasing the value of the angle between the floor of the vehicle 10 and the second shaft 408.

The tilt actuator 410 is mounted (e.g., rotatably coupled, pivotally coupled, etc.) to the shafts 408, 414 at the mounts 402, 438 (e.g., mounting members, mounting portions, attachment members, attachment portions, etc.). The mounts 402, 438 can be positioned at any position along the lengths of the second shaft 408 and the shaft housing 414. In some examples, an end of the tilt actuator 410 is pivotably coupled to the mount 402 such that the tilt actuator 410 may tilt upwards and downwards when expanding and retracting. An opposite end of the tilt actuator 410 may be fixedly coupled to the mount 438. In this way, when the tilt actuator 410 expands it pushes the second shaft 408 upwards, causing the second shaft 408 to rotate relative to the shaft housing 414.

As shown in FIGS. 6 and 7, the tilt actuator 410 includes an activator 440. The activator 440 may be located on a portion of the steering column assembly 400 (e.g., an end of the tilt actuator 410 coupled to the mount 438) such that the activator 440 extends past the dashboard of the vehicle 10, such that a user may access the activator 440 without removing any paneling. The activator 440 may be a lever (e.g., as shown in FIG. 6) or a button (e.g., as shown in FIG. 7). For example, the lever activator 440 may be coupled with a pneumatic valve and the tilt actuator 440 may be a pneumatic actuator. In this way, a user may engage the lever of the activator 440 to open or close the pneumatic valve to facilitate extending or retracting the tilt actuator 410. As the tilt actuator 410 extends or retracts, it pushes or pulls on the mount 438 connected thereto. The linear motion of the tilt actuator 110 is thereby transferred to the mount 438, causing the mount 438, and thereby the steering wheel 42, to rotate up or down (e.g., allowing pitch rotation).

As another example, the activator 440 may be coupled to an electric actuator. In one example, a user may engage the lever of the activator 440 to drive an electric motor is two different directions to facilitate extending or retracting the tilt actuator 410. In another example, a user may engage with a button of the activator 440 to facilitate extending or retracting the tilt actuator 410. In some instances, the activator 440 may include two inputs corresponding to an upwards input and a downwards input (e.g., a switch style hard key, a slidable button/joystick, an upward input button and a downward input button, etc.). The activator 440 can be wired to an electrical switch that activates the tilt actuator 410. Therefore, when a user presses or engages the activator 440, the electric actuator expands or retracts based on the user's input (e.g., expanding responsive to an upward input, retracting responsive to a downward input).

As shown in FIGS. 7 and 8, the second shaft 408 includes an engagement member, shown as spline 446, that extends inward into the internal chamber of the second shaft 408 that the first shaft 404 is received within. One or more splines 446 extend along the length of the interior surface of the second shaft 408. The splines 446 may be arranged in an array around the interior circumference of the second shaft 408. The splines 446 align with a corresponding feature or spline (e.g., a keyway, a notch, a channel, etc.) of the first shaft 404 axially within the second shaft 408. In this way, the splines 446 engage with the corresponding feature of the first shaft 404 to prevent the first shaft 404 from becoming misaligned within the second shaft 408 (e.g., by rotating within the second shaft 408). In some examples, the splines 446 are made of a lower friction material than the second shaft 408 and/or are be rounded laterally to facilitate smooth axial motion of the first shaft 404 relative to the second shaft 408.

As shown in FIG. 8, the locking assembly 406 is coupled to the second shaft 408 (e.g., via weldment, adhesive, mounting mechanisms, etc.). The first shaft 404 extends through a central opening of the locking assembly 406, allowing for control over the axial movement of the first shaft 404 via the locking assembly 406. The locking assembly 406 includes an expandable collar, shown as ring 442, and a tightener lever or mechanism, shown as clamp 444. The clamp 444 defines a locked position and an unlocked position. In the locked position, the clamp 444 pulls the ring 442 inward, tighter, or a more compressed state, causing it to tighten (e.g., to reduce in diameter) around the first shaft 404. In the unlocked position, the clamp 444 expands the ring 442 such that the first shaft 404 is allowed to move axially within the second shaft 408.

In some examples, the axial movement of the first shaft 404 is controlled by a linear actuator (e.g., the axial shift actuator 412 of FIG. 18) (e.g., a mechanical linear actuator, electric linear actuator, hydraulic cylinders, etc.). As an alternative to the locking assembly 406, the axial shift actuator 412 may extend between the first shaft 404 and the second shaft 408. Similar to the tilt actuator 410 of FIGS. 6 and 7, the axial shift actuator 412 may be affixed to the outer surface of the first shaft 404 and the second shaft 408 by one or more mounts. When the axial shift actuator 412 extends, the first shaft 404 is pushed away from the second shaft 408 and towards a user in the seating area 30. In other examples, the axial shift actuator 412 may be positioned within the second shaft 408. The axial shift actuator 412 may be coupled to the base of the second shaft 408 (e.g., the end furthest from the steering wheel 42) and the base of the first shaft 404. In this way, the axial shift actuator 412 may extend away from the base of the second shaft 408 to push the first shaft 404 towards a user in the seating area 30.

In other examples, the locking assembly 406 may be a friction fit bushing. The friction fit bushing includes a cylindrical body that is positioned inside the second shaft 408. The friction fit bushing may be made of rubber, polymer, aluminum, steel, or other similar materials. In exemplary embodiments, the friction fit bushing is positioned at the end of the second shaft 408 closest to the steering wheel 42. The first shaft 404 is disposed through a central opening in the friction fit bushing such that a portion of the first shaft 404 is positioned within the second shaft 408. The static coefficient of friction between the first shaft 404 and the friction fit bushing causes the first shaft 404 to remain stationary in position until a user applies a threshold axial force. Upon a user applying a compressive axial force to the first shaft 404 (e.g., by pushing downward on the steering wheel 42), the first shaft 404 shifts axially inward within the second shaft 408. Conversely, upon a user applying a tensive axial force to the first shaft 404 (e.g., by pulling the steering wheel 42 towards the user) the first shaft 404 shifts axially outward within the second shaft 408.

In some embodiments, the steering column assembly 400 includes one or more sensors configured to collect data indicative of the axial force applied by a user to the first shaft 404 (e.g., load cells, piezoelectric sensors, tension sensors, compression sensors, etc.). In some embodiments, the vehicle control system 100 determines a change in speed based on the sensor data. For example, the vehicle control system 100 may operate the prime mover 52 to accelerate responsive to receiving sensor data indicating that a user is applying a tensive axial force to the first shaft 404 (e.g., pulling the steering wheel towards the user). Conversely, the vehicle control system may operate the brake 46 responsive to receiving sensor data indicating that a user is applying a compressive axial force to the first shaft 404 (e.g., pushing the steering wheel away from the user). The vehicle control system 100 may operate the prime mover 52 and/or the brakes 46 proportionally to the amount of axial force applied by the user. For example, the vehicle control system 100 may operate the prime mover 52 to increase the speed more rapidly as more tensive axial force is applied to the first shaft 404. Similarly, the vehicle control system 100 may operate the brakes 46 and/or the prime move 52 (e.g., to provide regenerative braking) to increase the braking force applied by the brake 46 and/or the prime mover 52 (e.g., to decrease the speed of the vehicle 10) as more compressive axial force is applied to the first shaft 404. In some examples, the vehicle control system 100 may operate the prime mover 52 and/or the brakes 46 proportionally to the speed at which the first shaft 404 moves relative to the second shaft 408. Although this example describes axial force applications, it should be understood that the vehicle control system 100 can adjust the speed of the vehicle 10 based on the distance the first shaft 404 has moved relative to the second shaft 408 (e.g., the position of the first shaft 404 within the length of the second shaft 408), and/or the speed at which the first shaft 404 shifts axially within the second shaft 408.

Pedal Assembly

Figure 9:
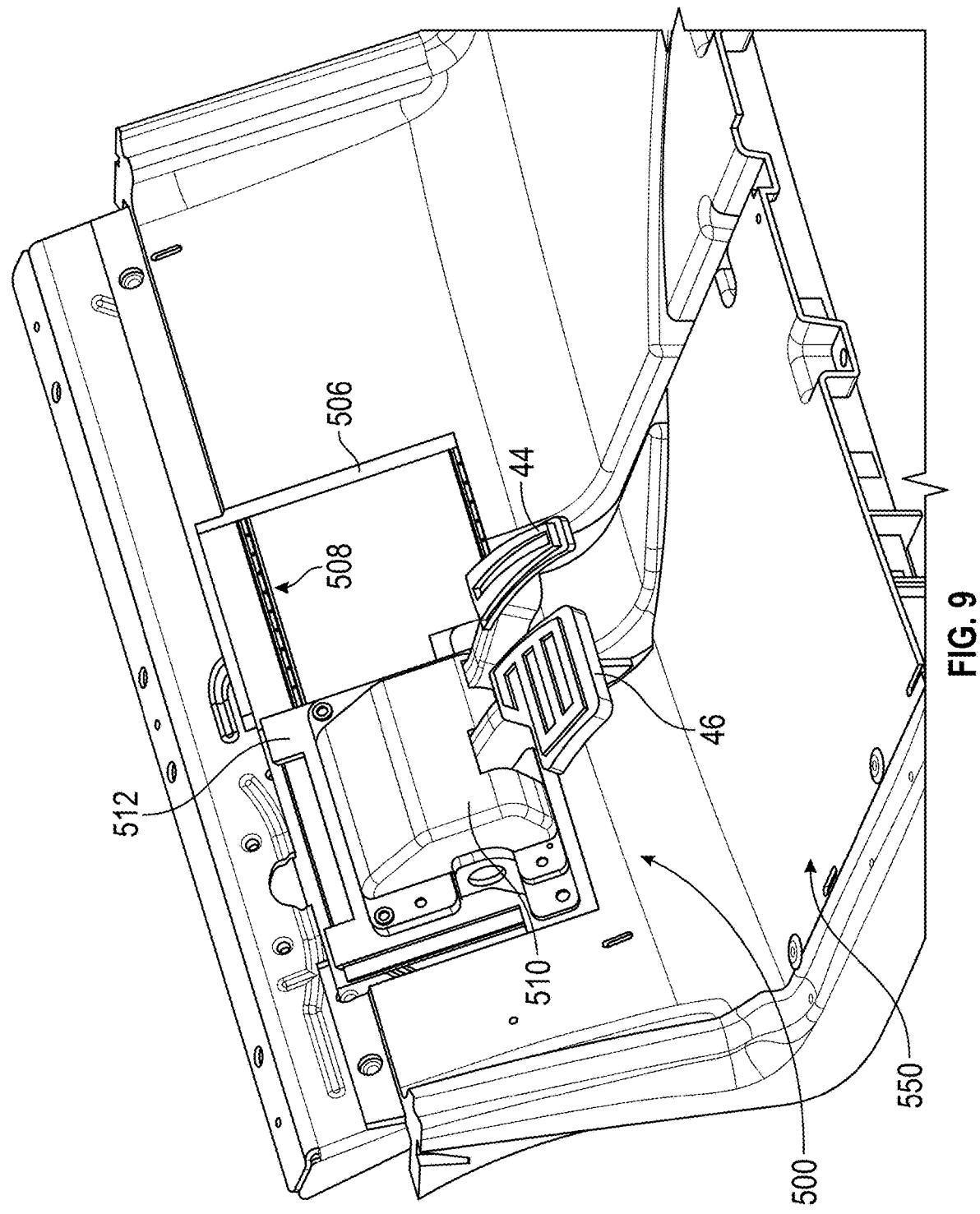
FIG. 9 is a front perspective view of an adjustable pedal assembly of the vehicle of FIG. 1, according to an exemplary embodiment.

Referring to FIGS. 9-12, the vehicle 10 includes an adjustable pedal assembly, shown as pedal assembly 500. As shown in FIG. 9, the pedal assembly 500 is positioned on a floorboard 550 of the vehicle 10. The floorboard 550 is coupled and/or supported by the frame 12. The floorboard 550 defines an aperture, shown as opening 506, at the front end of the floorboard 550 (e.g., along an angled or vertical surface of the floorboard 550) configured to receive the pedal assembly 500. In some embodiments, a cover (e.g., a bellow, a shift boot, etc.) is mounted on or over the opening 506. The cover may be coupled to the pedal assembly 500 such that the opening 506 is covered. According to an exemplary embodiment, the pedal assembly 500 is configured to move (e.g., translate, rotate, etc.) relative to the opening 506 and the floorboard 550, which is described in greater detailed herein. The cover may be configured to shift/flex with the pedal assembly 500 as it moves relative to the opening 506 and the floorboard 550. In this way, an operator of the vehicle 10 is not exposed to pinch points between pedal assembly 500 and the opening 506.

Figure 10:
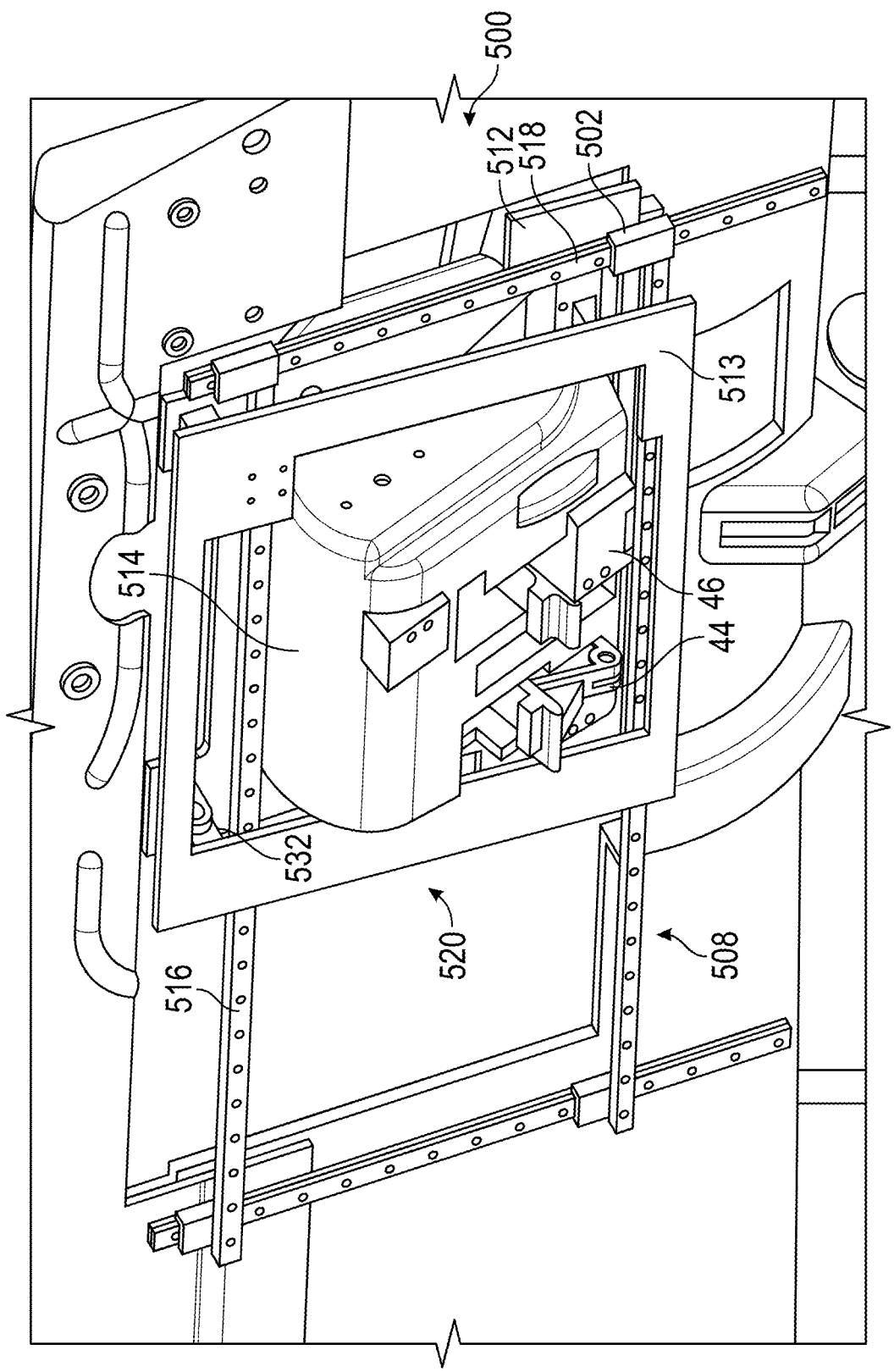
FIG. 10 is a rear perspective view of the adjustable pedal assembly of FIG. 9, according to an exemplary embodiment.
Figure 11:
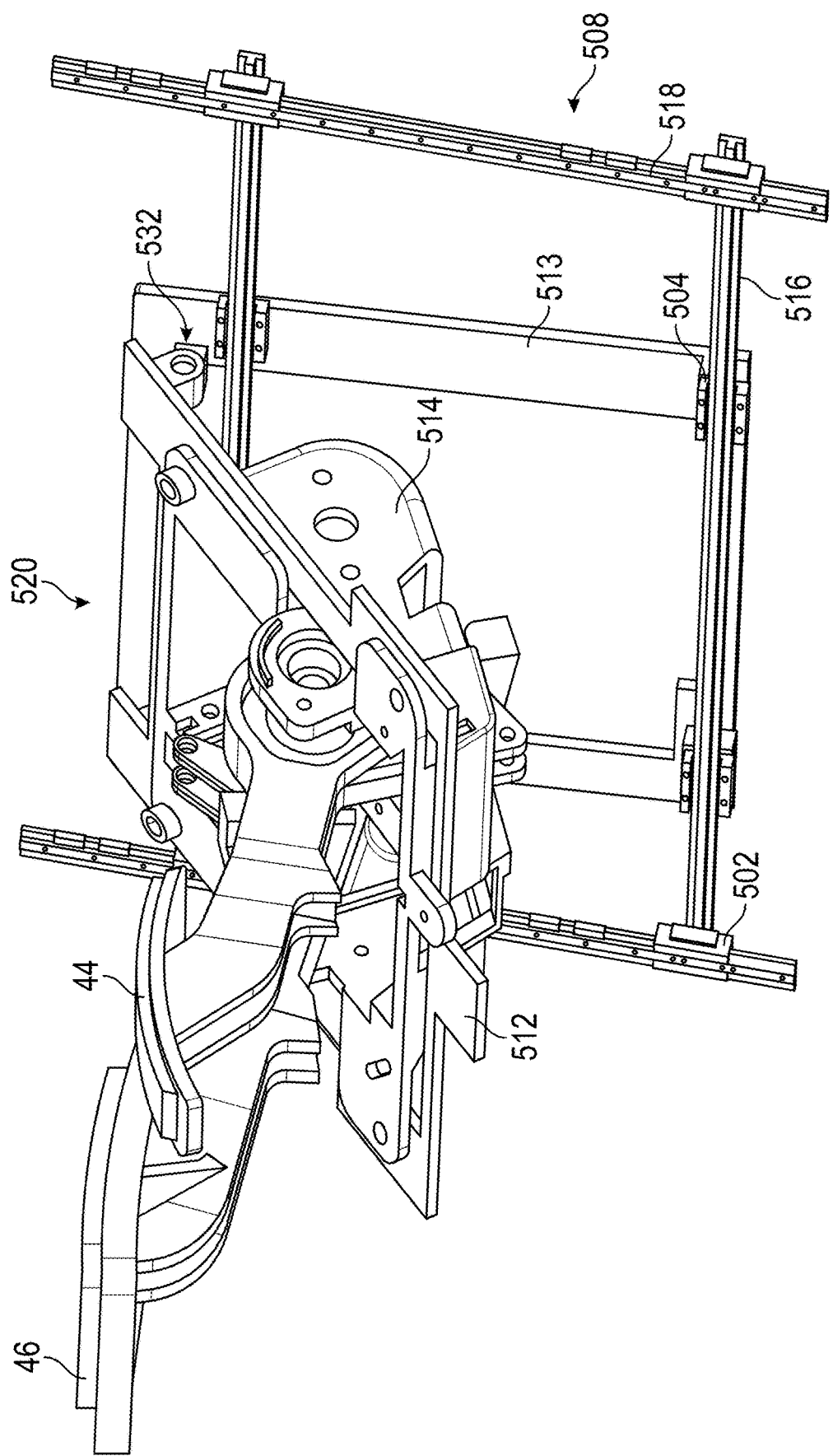
FIG. 11 is a perspective view of the adjustable pedal assembly of FIG. 9 pivoting relative to a frame assembly, according to an exemplary embodiment.

As shown in FIGS. 9-11, the pedal assembly 500 includes a housing including a first portion, shown as front pedal housing 510, a second portion, shown as rear pedal housing 514, the brake 46, and the accelerator 44. As shown in FIGS. 9 and 11, the brake 46 and the accelerator 44 extend from the front pedal housing 510. The brake 46 is operatively coupled (e.g., via the vehicle control system 100) with the braking components of the braking system 70 (e.g., disc brakes, drum brakes, in-board brakes, axle brakes, regenerative brakes, etc.) positioned to facilitate selectively braking one or more components of the driveline 50 of the vehicle 10. In this way, when an operator engages with the brake 46 (e.g., by pushing down on the pedal, by activating a switch, by operating a hand lever, etc.), the brake 46 causes the braking system 70 and/or the prime mover 52 to slow the vehicle 10 by applying one or more of the braking components. Similarly, the accelerator 44 is operatively coupled with the prime mover 52. In this way, when an operator activates the accelerator 44 (e.g., by pushing down on the pedal, by activating a switch, by operating a hand lever, etc.), the accelerator 44 causes the prime mover 52 to provide additional power and/or torque to drive the rear tractive assembly 56 and/or the front tractive assembly 58.

As shown in FIGS. 9-11, the pedal assembly 500 includes one or more frame assemblies, shown as first frame assembly 508 and as second frame assembly 520. The first frame assembly 508 is coupled to the floorboard 550 (e.g., by bolts, screws, welding, rivets, interlocking joints, etc.) and extends laterally across the opening 506. Additionally or alternatively, the first frame assembly 508 is coupled to the frame 12. The second frame assembly 520 is movably coupled to the first frame assembly 508 and the front pedal housing 510 is coupled to the second frame assembly 520 by connecting mechanisms (e.g., screws, bolts, rivets, welding, interlocking joints, etc.). As shown in FIGS. 10 and 11, the rear pedal housing 514 extends through and behind the opening 506 and through the first frame assembly 508 and the second frame assembly 520.

As shown in FIGS. 10 and 11, the first frame assembly 508 includes horizontal frame members 516 and vertical frame members 518. The vertical frame members 518 are shown to include one or more vertical sliders 502 configured to slide along the length of the vertical frame members 518. The horizontal frame members 516 are coupled to the vertical sliders 502 (e.g., by bolts, screws, adhesive, welding, etc.) such that the horizontal frame members 516 may translate along the length of the vertical frame members 518 via the vertical sliders 502. In some examples, the horizontal frame members 516 are driven to translate relative to the vertical frame members 518 by a vertical shift actuator 526 (shown in FIG. 18) (e.g., mechanical linear actuators, electric linear actuators, hydraulic cylinders, etc.).

As shown in FIGS. 9-11, the second frame assembly 520 includes a first portion, shown as front portion 512, and a second portion, shown as rear portion 513. According to exemplary embodiments, the front portion 512 is coupled to the rear portion 513 via a pivotable connector, shown as hinge 532. In this way, the front portion 512 may be driven to rotate relative to the rear portion 513. For example, the front portion may be driven to rotate by a tilt actuator 524 (see FIG. 18).

As shown in FIGS. 9 and 11, the front pedal housing 510 and the rear pedal housing 514 are coupled to the front portion 512 of the second frame assembly 520. Thus, when the front portion 512 is driven to rotate relative to the rear portion 513, the accelerator 44, the brake 46, the front pedal housing 510, and the rear pedal housing 514 are driven to rotate relative to the rear portion 513. As shown in FIG. 11, the rear portion 513 of the second frame assembly 520 is coupled to horizontal sliders 504 on the horizontal frame members 516 of the first frame assembly 508. In some examples, the pedal assembly 500 may be driven to translate along the horizontal frame members 516 via the horizontal sliders 504. For example, the pedal assembly 500 may be driven to translate by a horizontal shift actuator 522 (see FIG. 18). As shown in FIG. 11, the front portion 512 may be driven to rotate about the hinge 532 relative to the rear portion 513 to pivot the brake 46 and the accelerator 44 towards a user.

Figure 12:
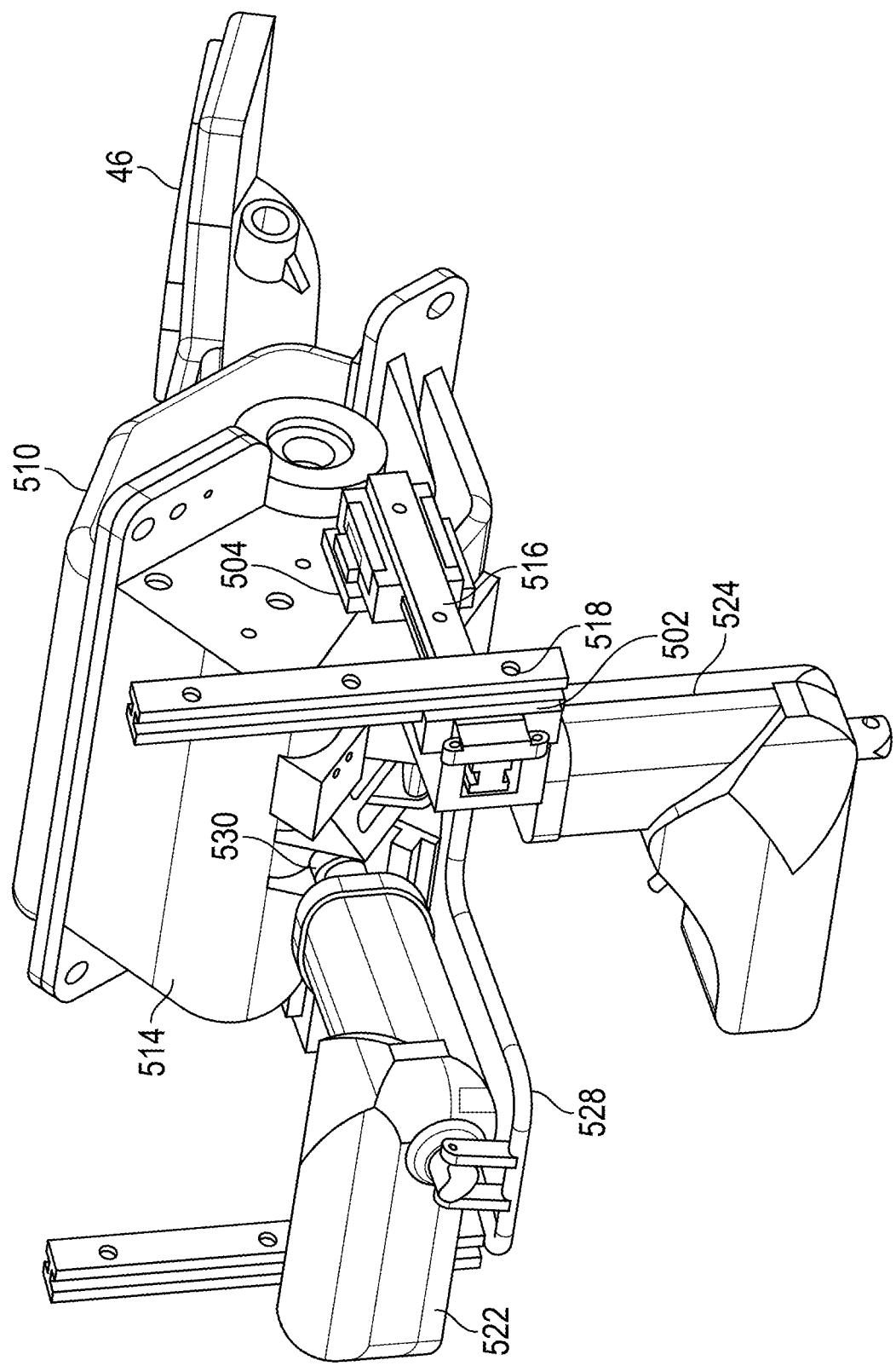
FIG. 12 is a rear perspective view of the adjustable pedal assembly of FIG. 9, according to an exemplary embodiment.

As shown in FIG. 12, the pedal assembly does not include the second frame assembly 520. In this example, the pedal assembly 500, and specifically, the rear pedal housing 514 is directly coupled to the horizontal sliders 504. In this example, the horizontal shift actuator 522 is coupled to the rear pedal housing 514 via a connection point 530. In this example, the horizontal shift actuator 522 may be operated (e.g., by user command, by the vehicle control system 100, etc.) to extend to push the pedal assembly 500 forward and away from the floorboard 550 or retract to pull the pedal assembly 500 towards the floorboard 550. Responsive to the horizontal shift actuator 522 expanding or retracting, the pedal assembly translates via the horizontal sliders 504 along the horizontal frame members 516.

The vertical shift actuator 526 may be coupled to the vertical slider 502 of the vertical frame member 518. The vertical shift actuator 526 is further coupled to the horizontal frame member 516 (e.g., via a bracket disposed around the horizontal frame members 516 and bolted/screwed onto the vertical slider 502). In this way, when the vertical shift actuator 526 expands or retracts, the horizontal frame members 516 translates vertically along the vertical frame member 518 via the vertical sliders 502. Since the horizontal slider 504 of the horizontal frame member 516 re coupled to the pedal assembly 500, the pedal assembly 500 shifts vertically responsive to expansion or retraction of the vertical shift actuator 526.

Seat Assembly

Figure 13:
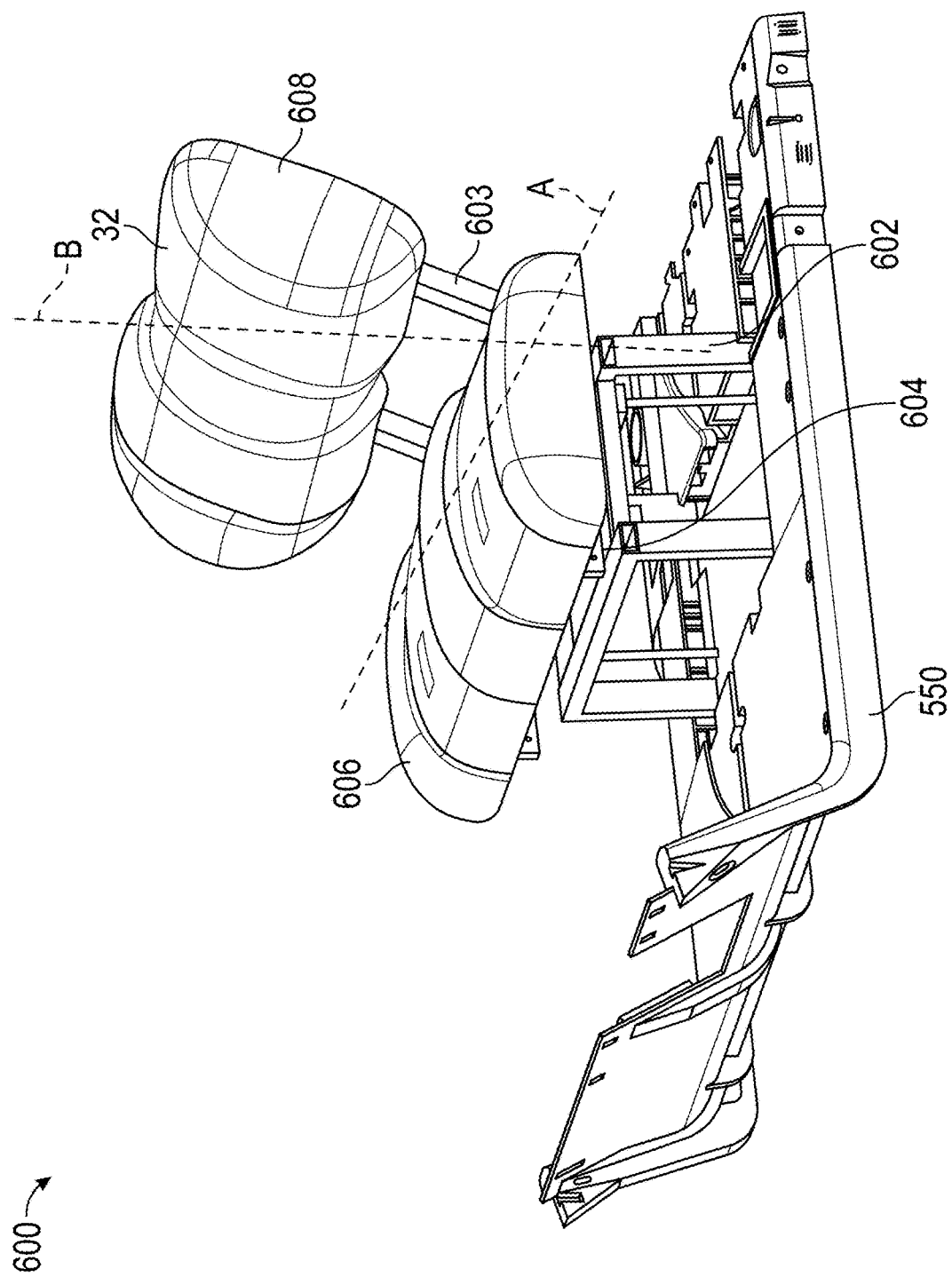
FIG. 13 is a perspective view of a seating assembly of the vehicle of FIG. 1, according to an exemplary embodiment.

As shown in FIGS. 13-17, the vehicle 10 includes an adjustable seating assembly, shown as seating assembly 600. In some examples, the seating assembly 600 is supported by the floorboard 550 and/or the frame 12. As shown in FIG. 13, the floorboard 550 includes an opening that receives a support, shown as pedestal 602, of the seating assembly 600, such that the pedestal 602 couples directly to, or be formed integrally with, the frame 12. In this example, the seating assembly 600 includes the front row seating 32. Though, the seating assembly 600 may be used for the rear row seating 34. As shown in FIGS. 13-16, the seating assembly 600 includes a seat cushion 606 coupled to a base support 618 and the pedestal 602. The seating assembly 600 further includes a back rest 608 coupled to a back support 603. The back support 603 is coupled with the base support 618 and/or the pedestal 602. In exemplary embodiments, the back support 603 is coupled to the base support 618 and/or the pedestal 602 via a hinge 610. In this way, the back support 603 is configured to rotate relative to the base support 618 (i.e., about axis A, towards or away from axis B, etc.).

Figure 16:
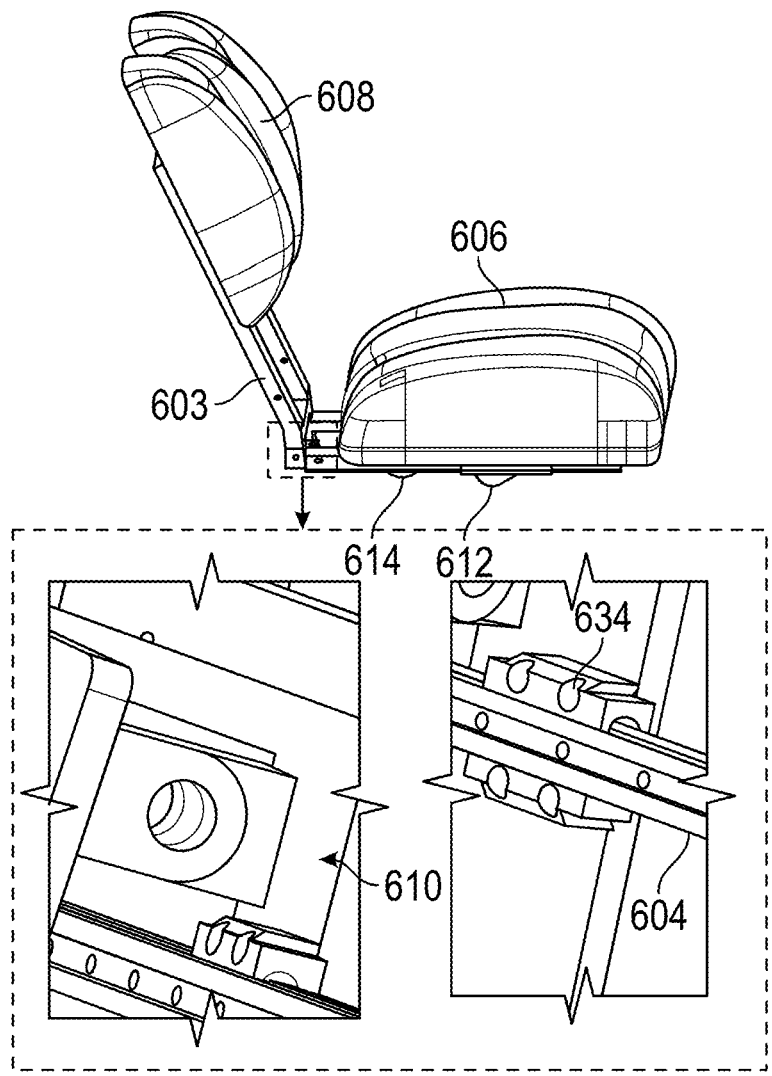
FIG. 16 is a side view and partial views of the seating assembly of FIG. 13, according to an exemplary embodiment.

As shown in FIGS. 14A-16, the seat cushion 606 is coupled to one or more rails 604. As shown in FIG. 16, the rails 604 include sliders 634 configured to translate along the length of the rails 604. In exemplary embodiments, the seat cushion 606 is coupled to the sliders 636, such that the seat cushion 606 can translate along the length of the rails 604. In some examples, the pedestal 602 is coupled to one or more tracks positioned on the floorboard 550 (not shown) via one or more sliders. In this way, the pedestal 602 can be configured to translate along the length of the rails on the floorboard 550.

In some examples, the pedestal 602 extends across/spans the first row seating 32 such that a single pedestal 602 supports the seat cushion 606 and the back rest 608 for multiple users. In this example, the back support 603 and the seat cushion 606 may each be a single/unitary cushion that extends across/spans the first row seating 32. In other examples, multiple individual pedestals 602 make up the first row seating 32. In this way, a single seat cushion 606 and a single back rest 608 (e.g., a cushion and support sized for a single user), and a single base support 618 are coupled to each pedestal 602. In this way, one user may rotate the back support 603 of the whole first row seating 32, or each individual user may have an option to rotate the back support 603 for their individual pedestal 602/seat. Similarly, one user may shift the seat cushion 606 of the whole first row seating 32, or each individual may have the option to shift the seat cushion 606 for their individual seat/pedestal 602. Additionally or alternatively, rather than shifting the seat cushion 606, a user may shift the pedestal 602 along the tracks on the floorboard 550, thereby shifting the entire seating assembly 600.

Figure 14A:
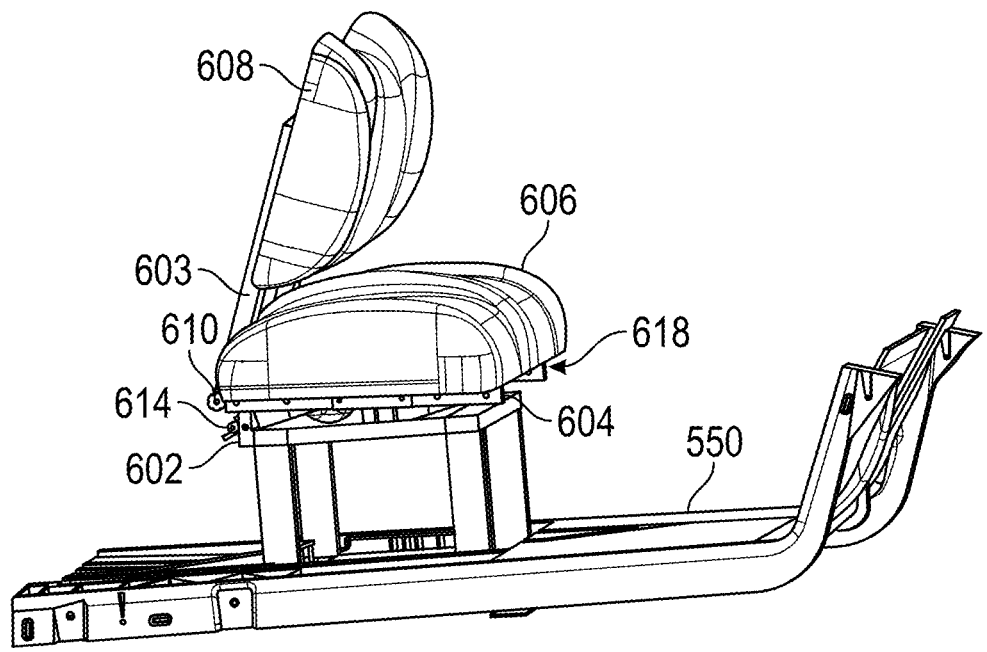
FIGS. 14A and 14B are sequential perspective views of a back support of the seating assembly of FIG. 13 pivoting, according to an exemplary embodiment.
Figure 14B:
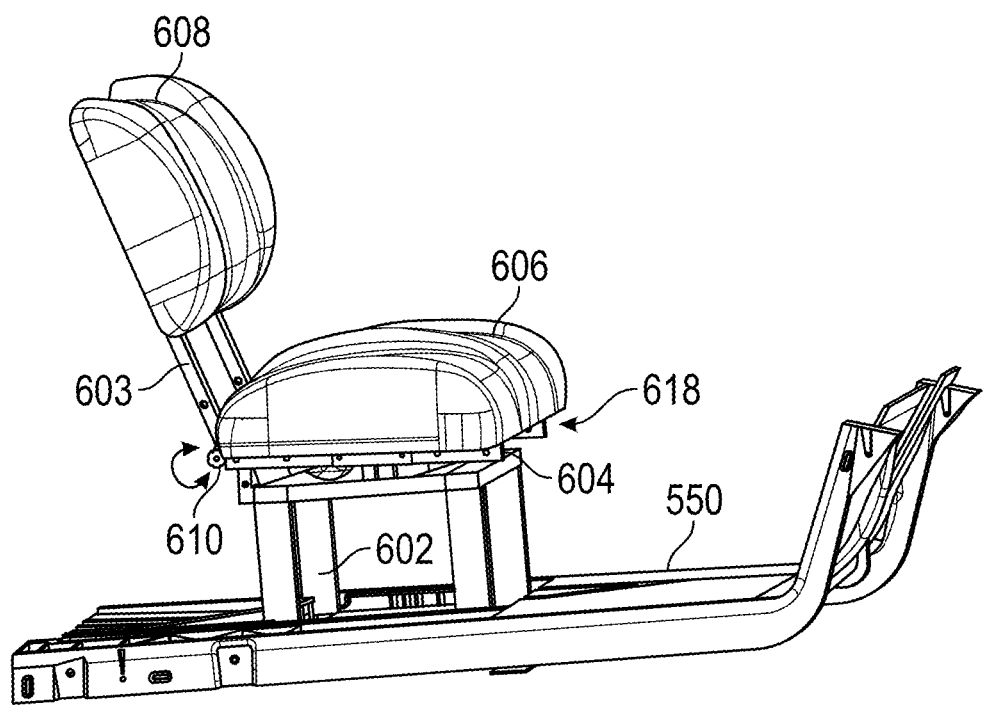
Figure 15A:
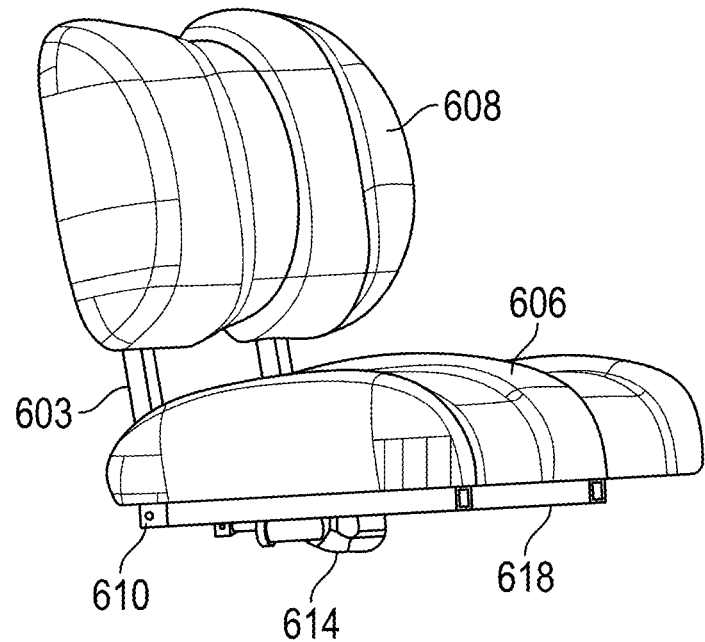
FIGS. 15A and 15B are partial views of the seating assembly of FIG. 13, according to an exemplary embodiment.
Figure 15B:
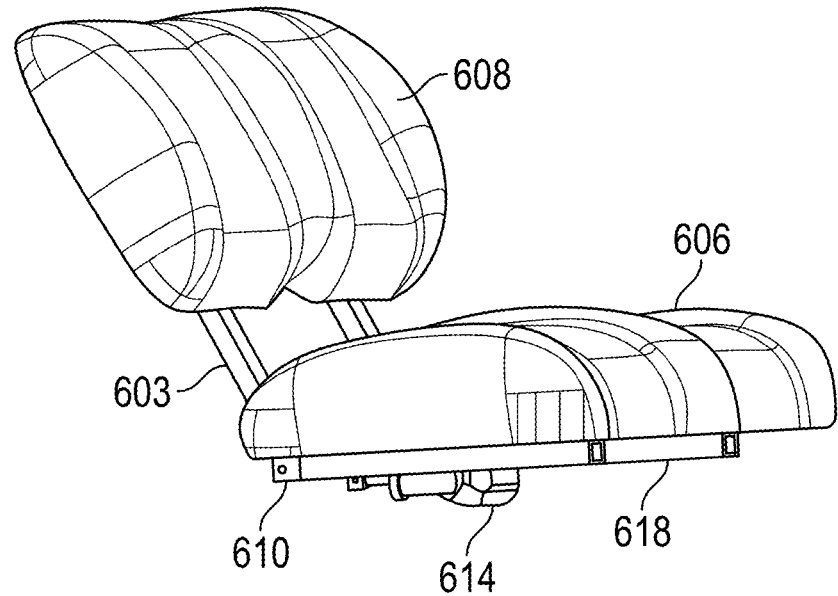

As shown in FIGS. 14A and 14B, the back support 603 may be driven to rotate relative to the base support 618, for example, by an actuator (e.g., tilt actuator 614 shown in FIG. 18) or by activating a mechanical release (e.g., a lever, button, switch, etc.). In some examples, the base support 618 is configured to be raised and lowered relative to the pedestal 602. For example, a lift actuator 616 (see FIG. 18) may be positioned between the pedestal 602 and the base support 618. The lift actuator 616 may be operated (e.g., by the vehicle control system 100 responsive to a user input, by a user via a mechanical activator such as a lever, button, switch, etc.) to extend and push the base support 618, and the seat cushion 606 thereon, upwards, relative to the pedestal 602 (e.g., away from the pedestal 602). Similarly, the lift actuator 616 may be operated to retract to pull the base support 618, and the seat cushion 606 thereon, downwards, relative to the pedestal 602 (e.g., towards the pedestal 602).

As shown in FIGS. 15A-17, the tilt actuator 614 is coupled to the back support 603 at a first end of the tilt actuator 614. The tilt actuator 614 may be coupled to the base support 618 or the pedestal 602 at a second end of the tilt actuator 614. The tilt actuator 614 may be configured to extend or retract (e.g., increase in overall length, or decrease in overall length) to facilitate pivoting of the back support 603 relative to the base support 618 via the hinge 610. In this way, when the tilt actuator 614 is operated to extend, the tilt actuator 614 pushes the back support 603 to rotate away from the seat cushion 606 via the hinge 610. Similarly, when the tilt actuator 614 is operated to retract, the tilt actuator 614 pulls the back support 603 to rotate towards the seat cushion 606 via the hinge 610.

Figure 17:
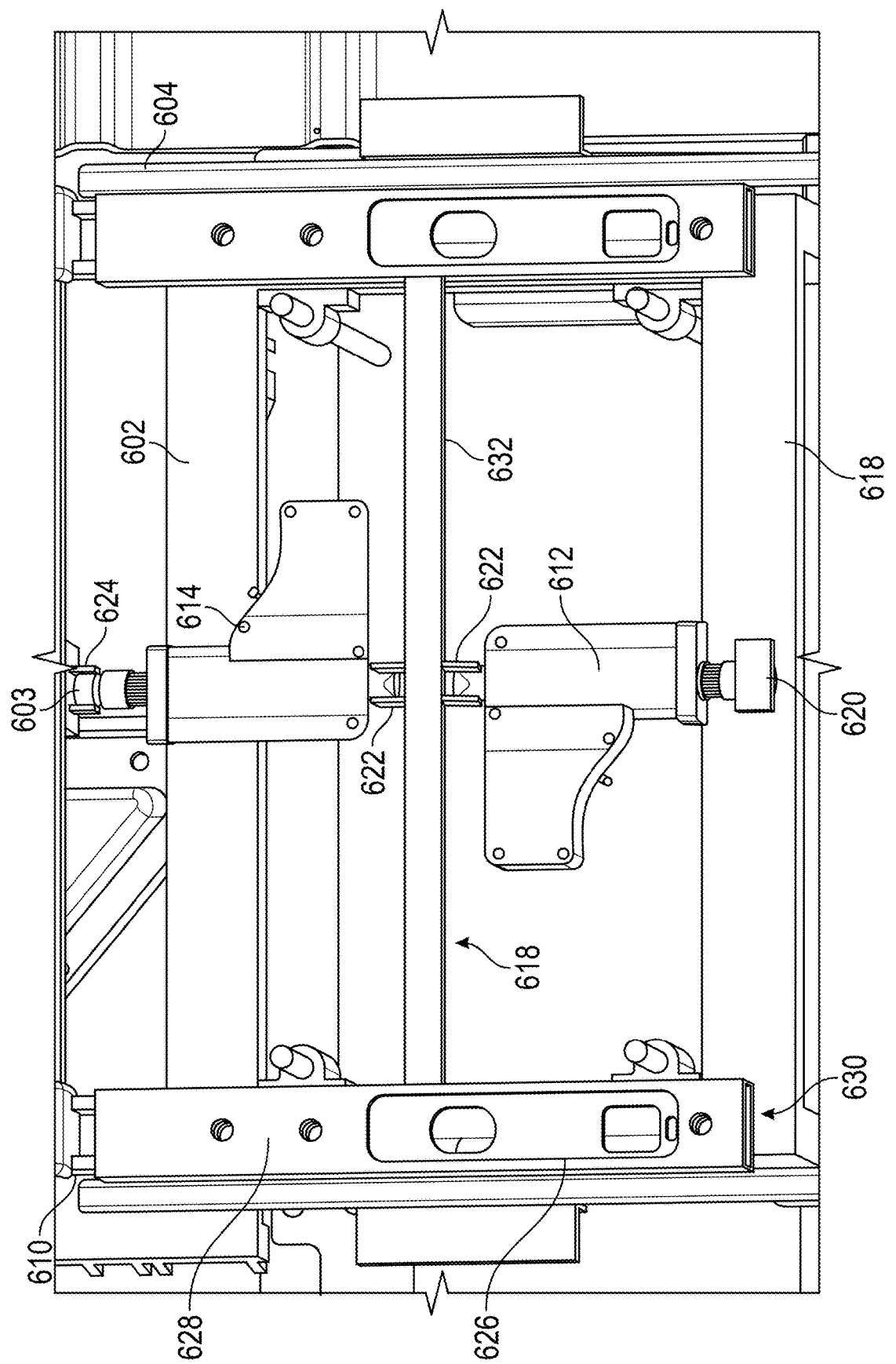
FIG. 17 is a bottom view of the seating assembly of FIG. 13, according to an exemplary embodiment.

As shown in FIGS. 16 and 17, the horizontal shift actuator 612 may be configured to extend or retract (e.g., increase in overall length, or decrease in overall length) to facilitate the translation of the seat cushion 606 along the rails 604 via the slider 634. As shown in FIG. 17, the base support 618 includes a crossbar 632 and a pair of telescoping rails 630. The seat cushion 606 may be coupled to the crossbar 632 and/or to the pair of telescoping rails 630. The telescoping rails 630 include a bottom rail 626 and a top rail 628. In some embodiments, either the bottom rail 626 or the top rail 628 can be driven to extend, allowing one rail to move outward relative to the other, or to retract, bringing the bottom rail 626 and the top rail 628 into closer alignment. The crossbar 632 is shown to be coupled to (e.g., welded, bolted, screwed, adhered to, or formed integrally with) the top rail 628. In some examples, the hinge 610 is coupled to the top rail 628, such that movement of the top rail (e.g., by the horizontal shift actuator 612) also moves the hinge 610, the back support 603, and the back rest 608. In other embodiments, the back support 603 is coupled to the pedestal 602 such that the back support 603 does not translate with the base support 618.

As shown in FIG. 17, the horizontal shift actuator 612 is coupled to the base support 618 via a connector 620 (e.g., a bracket or other similar receiving mechanism) and to the crossbar 632 of the base support at the other end via a connector 622 (e.g., clamp, a pair of plates bolted/screwed to the horizontal shift actuator 612, etc.). In this way, the horizontal shift actuator 612 may extend to push the crossbar 632 away from a front of the base support 618, thereby causing the top rail 628 of the telescoping rails 630 to slide away from the bottom rail 626. The seat cushion 606, in turn, shifts horizontally (e.g., via the sliders 634 of the rails 604) relative to the pedestal 602, thereby bringing the seat cushion 606 backwards (e.g., away from the dashboard of the vehicle 10). If the top rail 628 is coupled to the hinge 610, the back support 603 and the back rest 608 thereon shift backward with the seat cushion 606. Similarly, the horizontal shift actuator 612 may retract to pull the crossbar 632 towards the front of the base support, thereby causing the top rail 628 to at least partially align with the bottom rail 626 to shorten the length of the telescoping rails 630. The seat cushion 606, in turn, shifts horizontally (e.g., via the sliders 634 of the rails 604) relative to the pedestal 602, thereby bringing the seat cushion 606 forward (e.g., towards the dashboard of the vehicle 10). The top rail 628 pulls the back support 603 and the back rest 608 thereon via the hinge 610 to shift forwards with the seat cushion 606.

In some examples, the horizontal shift actuator 612, or some other linear actuator, is coupled to the pedestal 602 at one end and to the floorboard 550 at the other end. In this way, the horizontal shift actuator 612 may extend and retract to push the pedestal 602 along the rails of the floorboard 550. In this way, the entire seating assembly 600 may translate along the floorboard 550 to move a user closer or further from the dashboard of the vehicle 10.

As shown in FIG. 17, the tilt actuator 614 is coupled to the crossbar 632 at one end via a second connector 622 at one end and is coupled to a portion of the back support 603 via a connector 624 (e.g., a bracket, a clamp, a pair of plates bolted/screwed to the tilt actuator 614). When the tilt actuator 614 extends, it pushes the back support 603, causing it to rotate around the hinge 610, which serves as the pivot point between the back support 603 and the base support 618. In some examples, the tilt actuator 614 is coupled to the base support 618 along the length of the base support 618, rather than at an end closest to the base support 618. In this way, the tilt actuator 614 may extend diagonally to push the base support 618 to rotate via the hinge 610. This positioning creates a lever arm, defined by the vertical distance between the connector 624 and the hinge 610. This reduces the force the tilt actuator 614 needs to generate in order to rotate the back support 603 around the hinge 610.

In some embodiments, one or more of the actuators 612, 614, 616 are replaced by alternative adjustment mechanisms. For example, in addition or as an alternative to the lift actuator 616, an adjustable bladder may be coupled to the seat cushion 606. The bladder may be inflated or deflated (e.g., by a pump, by orifices, etc.) to increase or decrease an internal air volume. When the bladders are inflated, the seat cushion 606 is raised relative to the pedestal 602. When the bladder is deflated, the seat cushion is lowered relative to the pedestal 602. In exemplary embodiments, the bladders are filled with air, however, any other suitable fluids or gases may be used.

As another example, one or more of the actuators 612, 614, 616 may be replaced by a cable and pulley system. A series of cables and pulleys may be attached to sections of the seating assembly 600 (e.g., the pedestal 602, the base support 618, etc.). By way of example, a user may apply tension to a cable (e.g., manually, via a motor, via a rotary actuator, etc.) to pull the cable over an associated pulley to translate or lift the seat cushion 606, to recline/tilt the back rest 608, or to shift the pedestal 602 along the floorboard 550. For example, a pulley may be mounted on the base support 618 and have an associated cable routed to the back support 603. In this example, a user may release tension to recline the back support 603 and may apply tension to pull the back support 603 forwards to adjust the angle relative to the seat cushion 606.

In some embodiments, a single actuator may be coupled to a bar system to move the seating assembly 600. For example, a base frame may be coupled to the floorboard 550, the pedestal 602, or the base support 618. The base frame may include scissor legs that intersect to form an "X" shape.

The scissor legs are coupled to the seat cushion 606 (e.g., via the base support 618, via a platform, etc.) at an end opposite the base frame. The composition of the "X" shape may be changed by an actuator coupled to the scissor legs. For example, when the actuator extends, the scissor legs pivot at their junction points, causing upward motion of the seat cushion 606. When the actuator retracts, the scissor legs pivot at their junction point to cause downward motion of the seat cushion 606.

Figure 18:
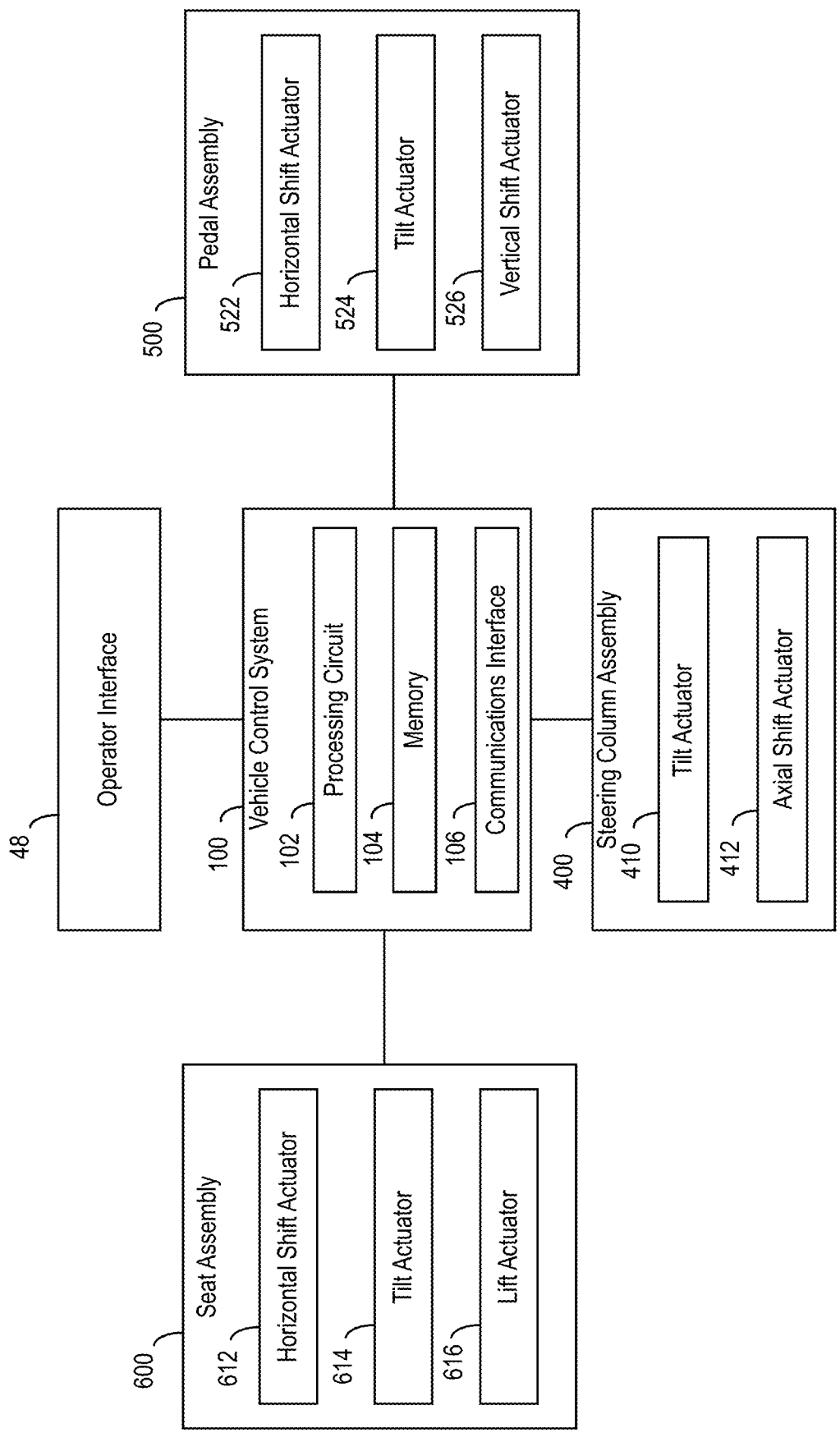
FIG. 18 is a schematic diagram of the control system of FIG. 2 and various actuators of the steering column assembly of FIGS. 4-8, the pedal assembly of FIGS. 9-12, and the seating assembly of FIGS. 13-17, according to an exemplary embodiment.

Referring to FIG. 18, a schematic diagram of the actuators of the steering column assembly 400, the pedal assembly 500, and the seating assembly 600 is shown, according to an exemplary embodiment. The vehicle control system 100 is communicatively coupled to the steering column assembly 400, the pedal assembly 500, and the seating assembly 600 such that the vehicle control system 100 may transmit control signals to operate the various actuators of the steering column assembly 400, the pedal assembly 500, and the seating assembly 600. In some embodiments, the actuators of the steering column assembly 400, the pedal assembly 500, and the seating assembly 600 are electric actuators or other similar types of actuators configured to be operated by the vehicle control system 100. According to exemplary embodiments, a user may input adjustments via the operator interface 48 to control the actuators. For example, a user may make an input on the operator interface 48 (e.g., pushing a button, pulling a lever, pushing laterally on a joystick, making a selection on a graphical user interface (GUI), etc.) indicating that they desire to shift the steering wheel 42 towards themselves. The vehicle control system 100 receives the user input and operates the axial shift actuator 412 to extend, thereby pushing the first shaft 404 away from the second shaft 408. The vehicle control system 100 may continue to operate the axial shift actuator 412 to extend until the user input ends (e.g., the user stops pressing the button, pulling the lever, pushing the joystick, interacting with the GUI, etc.). As another example, a user may make an input on the operator interface 48 indicating that they desire to move the pedal assembly 500 to the right or left. The vehicle control system 100 receives the user input and operates the horizontal shift actuator 522 to extend, thereby shifting the rear portion 513 to translate along the horizontal frame members 516 of the first frame assembly 508 via the horizontal sliders 504. The vehicle control system 100 may continue to operate the horizontal shift actuator 522 to extend until the user input ends (e.g., the user stops pressing the button, pulling the lever, pushing the joystick, interacting with the GUI, etc.). As another example, a user may make an input on the operator interface 48 indicating that they desire recline of the back rest 608 of the seating assembly 600. The vehicle control system 100 receives the user input and operates the tilt actuator 614 to extend, thereby pushing the back support 603 to rotate around the hinge 610. The vehicle control system 100 may continue to operate the tilt actuator 614 to extend until the user input ends (e.g., the user stops pressing the button, pulling the lever, pushing the joystick, etc.).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the fleet monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:
1. A golf cart comprising:
a chassis;
a floorboard coupled to the chassis, the floorboard defining an opening;
a seat positioned along the floorboard;
a prime mover;
a plurality of tractive elements, at least one of the plurality of tractive elements driven by the prime mover; and
a pedal assembly including:
a housing at least partially disposed within the opening;
a brake pedal coupled to the housing;
an accelerator pedal coupled to the housing;
a first frame assembly extending across the opening; and
a second frame assembly slidably coupled to the first frame assembly, the housing coupled to the second frame assembly;
wherein the pedal assembly is (a) laterally translatable along the floorboard and (b) at least one of pivotable or extendable towards and away from the seat.

2. The golf cart of claim 1, further comprising a bellow coupled to the floorboard and the housing to enclose the opening.

3. The golf cart of claim 1, wherein the second frame assembly includes:
a first portion slidably coupled to the first frame assembly; and
a second portion pivotably coupled to the first portion, the housing coupled to the second portion.

4. The golf cart of claim 1, further comprising an actuator configured to horizontally translate the pedal assembly relative to the floorboard.

5. The golf cart of claim 1, further comprising an actuator configured to extend the pedal assembly towards and away from the seat.

6. The golf cart of claim 1, further comprising an actuator configured to pivot the pedal assembly towards and away from the seat.

7. A recreational vehicle comprising:
a chassis;
a floorboard coupled to the chassis, the floorboard defining an opening;
a seat positioned along the floorboard;
a prime mover;
a plurality of tractive elements, at least one of the plurality of tractive elements driven by the prime mover; and
a pedal assembly at least partially disposed within the opening, the pedal assembly including:
a first frame assembly extending across the opening;
a second frame assembly slidably coupled to the first frame assembly; and
a pedal housing coupled to the second frame assembly;
wherein the pedal assembly is at least one of (a) laterally translatable along the floorboard or (b) at least one of pivotable or extendable towards and away from the seat.

8. The recreational vehicle of claim 7, further comprising a bellow coupled to the floorboard and the pedal assembly to enclose the opening.

9. The recreational vehicle of claim 7, wherein the second frame assembly includes:
a first portion slidably coupled the first frame assembly; and
a second portion pivotably coupled to the first portion, the pedal housing coupled to the second portion.

10. The recreational vehicle of claim 7, further comprising an actuator configured to horizontally translate the pedal assembly relative to the floorboard.

11. The recreational vehicle of claim 7, further comprising an actuator configured to extend the pedal assembly towards and away from the seat.

12. The recreational vehicle of claim 7, further comprising an actuator configured to pivot the pedal assembly towards and away from the seat.

13. The recreational vehicle of claim 7, wherein the pedal assembly is (a) laterally translatable along the floorboard and (b) pivotable towards and away from the seat.

14. The recreational vehicle of claim 7, wherein the pedal assembly is (a) laterally translatable along the floorboard and (b) extendable towards and away from the seat.

15. An adjustable pedal assembly for a recreational vehicle, the adjustable pedal assembly comprising:
- a first frame assembly:
- a second frame assembly slidably coupled to the first frame assembly;
- a pedal housing coupled to the second frame assembly;
- a brake pedal coupled to the pedal housing;
- an accelerator pedal coupled to the pedal housing;
- a first actuator configured to pivot or translate the pedal housing in a first direction; and
- a second actuator configured to translate the pedal housing in a second direction.

16. The adjustable pedal assembly of claim 15, wherein the first actuator is configured to pivot the pedal housing.

17. The adjustable pedal assembly of claim 15, wherein the first actuator is configured to translate the pedal housing.

* * * * *